US007269824B2

(12) United States Patent
Noy et al.

(10) Patent No.: US 7,269,824 B2
(45) Date of Patent: Sep. 11, 2007

(54) SOFTWARE BEHAVIOR PATTERN RECOGNITION AND ANALYSIS

(75) Inventors: Oded Noy, Marina del Rey, CA (US); Jason McBride, Marina del Rey, CA (US)

(73) Assignee: Path Reliability, Inc., Los Angeles, CA (US)

( * ) Notice: Subject to any disclaimer, the term of this patent is extended or adjusted under 35 U.S.C. 154(b) by 525 days.

(21) Appl. No.: 10/366,010

(22) Filed: Feb. 13, 2003

(65) Prior Publication Data

US 2004/0163079 A1  Aug. 19, 2004

(51) Int. Cl.
*G06F 9/44* (2006.01)

(52) U.S. Cl. .................. 717/127; 717/130; 717/131

(58) Field of Classification Search ............ 717/130, 717/131, 103, 108, 109, 120, 124, 127, 128; 702/176–183, 188, 141; 705/10; 709/224; 714/38–40, 47–48

See application file for complete search history.

(56) References Cited

U.S. PATENT DOCUMENTS

| | | | | |
|---|---|---|---|---|
| 4,845,615 | A | * | 7/1989 | Blasciak ..................... 714/10 |
| 5,047,919 | A | * | 9/1991 | Sterling et al. ............... 714/47 |
| 5,193,179 | A | * | 3/1993 | Laprade et al. .............. 714/47 |
| 5,450,586 | A | * | 9/1995 | Kuzara et al. .............. 717/124 |
| 5,608,894 | A | * | 3/1997 | Kawakami et al. ......... 717/162 |
| 5,732,273 | A | | 3/1998 | Srivastava et al. |
| 5,790,858 | A | | 8/1998 | Vogel |
| 5,872,909 | A | * | 2/1999 | Wilner et al. ................ 714/38 |
| 5,987,249 | A | | 11/1999 | Grossman et al. |
| 6,061,724 | A | * | 5/2000 | Ries et al. .................. 709/224 |
| 6,085,029 | A | | 7/2000 | Kolawa et al. |
| 6,186,677 | B1 | | 2/2001 | Angel et al. |
| 6,260,187 | B1 | | 7/2001 | Cirne |
| 6,263,298 | B1 | | 7/2001 | Kerman et al. |
| 6,332,213 | B1 | | 12/2001 | Grossman et al. |
| 6,356,859 | B1 | * | 3/2002 | Talbot et al. ................ 702/188 |
| 6,405,327 | B1 | * | 6/2002 | Sipple et al. ................. 714/39 |
| 6,760,903 | B1 | * | 7/2004 | Morshed et al. ............ 717/130 |
| 2002/0087383 | A1 | * | 7/2002 | Cogger et al. ................ 705/10 |
| 2004/0030531 | A1 | * | 2/2004 | Miller et al. ................ 702/182 |

OTHER PUBLICATIONS

Sanjay Sharma et al., "Rum-Time Monitoring of Concurrent Programs on the Cedar Multiprocessor", Nov. 1990, IEEE Computer Society, p. 784-793.*
Dieter Wybranietz and Dieter haban, "Monitoring and performance measuring distributed system during operation", 1988, ACM Press, 1988 ACM Sigmetrics, pp. 197-206.*

* cited by examiner

*Primary Examiner*—Wei Zhen
*Assistant Examiner*—Anna Deng
(74) *Attorney, Agent, or Firm*—Liu & Liu

(57) ABSTRACT

A target software behavior pattern recognition and analysis tool is disclosed that operates during the real-time execution of monitored target software on a computer, derives a subset of measurements indicating the target software performance and activity, automatically derives a baseline from the subset of measurements, and establishes a state of health of the target software based on comparing real-time measurements to the baseline. The monitored target software contains an agent for deriving a subset of measurements indicating the target software performance and activity. The agent includes sensors embedded into the target software to measure specific code segments, and an examiner which receives measurements from the sensors and transmits these examiner values to a central server. The central server automatically derives a baseline from the received examiner values, and automatically establishes a state of health of the target software based on comparing real-time measurements to the baseline.

62 Claims, 18 Drawing Sheets

SOFTWARE BEHAVIOR PATTERN RECOGNITION AND ANALYSIS

FIELD OF THE INVENTION

This invention relates to software performance analysis, and more particularly, to the real-time capture, recognition, and analysis of target software behavior.

BACKGROUND OF THE INVENTION

Monitoring the performance of computing systems is important for maintaining the health and performance of the computing system. Both hardware and software can be monitored. In hardware monitoring, measurements can be tuned for specific hardware, because the hardware itself does not change over time. Thus, hardware measurements can be patterned (automatically averaged over time to created a baseline) and compared to real-time measurements. However, because software is much more unstructured and constantly changing (e.g. continuously varying frequency of subroutine calls), it is generally not possible to derive one measurement that can be patterned.

In conventional software monitoring systems (profilers), sensors are placed throughout the target software to capture large amounts of data in a short time. Conventional software profilers record every code segment (for example, methods and subroutines) in terms of who called it, when it started, and when it ended. Once the data is captured, data mining sweeps are performed on the data to detect data anomalies. However, one drawback to such systems is that because the sensors are typically tracked all the time, they generate so much data that they can only operate for short periods of time. In addition, because target software performance is dependent on the time of day (e.g. target software performance is different during peak hours and off-peak hours), the captured data may not reflect target software performance during other times.

Conventional software monitoring systems also require that the sensors and sensor baselines be established prior to testing. In other words, sensors have to be inserted in specific locations and be configured to test for certain thresholds. The establishment of these sensors is made much more difficult if the computing system couples together two or more software applications not designed to operate together. With such combined systems, predicting and instrumenting the performance of dissimilar software is complex and difficult to predict. Furthermore, in conventional software monitoring system, sensors can be relocated and reconfigured only after human intervention.

Therefore, a need exists for real-time target software monitoring that overcomes the limitations of conventional systems.

SUMMARY OF THE INVENTION

Aspects of the present invention are directed to a target software behavior pattern recognition and analysis tool that operates during the real-time execution of monitored target software on a computer, automatically derives a subset of measurements indicating performance and activity of the monitored target software, automatically derives a baseline from the subset of measurements, and establishes a state of health of the monitored target software based on comparing real-time measurements to the baseline.

Each piece of software being monitored (the target software) contains an agent for deriving a subset of measurements indicating the target software performance and activity. The agent is comprised of one or more sensors embedded into the target software to measure specific code segments, and multiple examiners which control the data received from the sensors, generate measurements from the sensors from different perspectives, transmit examiner values to a central server, and receive configuration information from the central server. Configuration information may include, but is not limited to, the central server network address, the frequency of transmissions from the agents to the central server, or the name of the target software being monitored. The central server, which is usually located in a separate location from the monitored target software, receives an automatically determined subset of examiner values from multiple agents, automatically derives a baseline from the received subset of examiner values, and automatically establishes a state of health characteristic of the target software based on comparing real-time measurements to the baseline. The state-of-health characteristic is indicative of the degree that the real-time performance comports to baseline expectations. In preferred embodiments, the state-of-health characteristic may also be indicative of a known type of misbehavior pattern whose known deviation from baseline conditions has been previously recorded. Optionally, normalized gauge values and alerts for anomalies may be generated.

Thus, for example, given a piece of monitored target software of unknown performance or behavior characteristics, although 50,000 measurement points may be instrumented via the sensors, embodiments of the present invention identify, for example, approximately 50 of those measurements that are determined necessary to gauge whether the monitored target software is running correctly according to expectations. Moreover, from the 50 measurements, embodiments of the present invention can identify the code segments at which the target software is not running correctly. Embodiments of the present invention can determine the behavior parameters of the target software, report on abnormalities, identify what behavior parameters indicated the abnormality, and locate the code segment that is most likely causing the problem based on observation and analysis of the running code rather than on prior knowledge of its design and functionality. Furthermore, because of the increased efficiency of utilizing 50 data points instead of 50,000, the target software behavior pattern recognition and analysis tool of the present invention can operate efficiently, with perhaps less than 1% overhead, while maintaining multiple baselines and analyzing target software behavior over selected periods of time.

Embodiments of the present invention are also advantageous in that diagnostic assumptions regarding problem code segments and problem machines are largely unnecessary, because the problem areas are automatically identified by the tool. In addition, because the functionality and operational intricacies of the monitored target software need not be known, problem source identification of multiple cooperating target software packages can be performed whether the applications were designed in advance to work together or not.

DETAILED DESCRIPTION OF THE PREFERRED EMBODIMENT

In the following description of preferred embodiments, reference is made to the accompanying drawings, which form a part hereof, and in which is shown by way of illustration specific embodiments in which the invention may be practiced. It is to be understood that other embodiments may be utilized and structural changes may be made without departing from the scope of aspects of the present invention.

Overview

Embodiments having aspects of the present invention are directed to a target software behavior pattern recognition and analysis tool that (1) operates during the real-time execution of monitored target software on a computer, (2) automatically derives a subset of measurements indicating performance and activity of the monitored target software, (3) automatically derives a baseline from the subset of measurements, and (4) establishes a state of health of the monitored target software based on comparing real-time measurements to the baseline.

Figure 1:
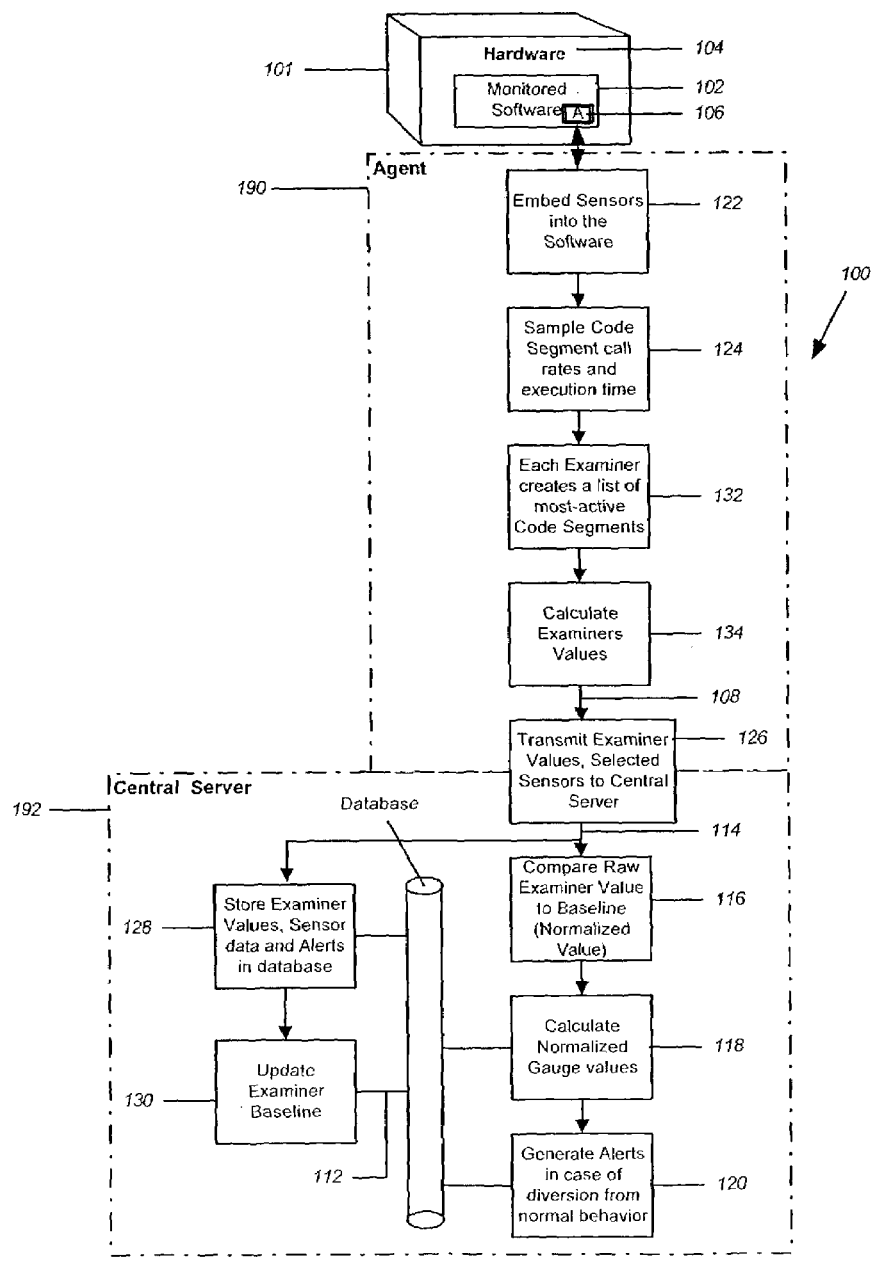
FIG. 1 illustrates an overview block diagram of a target software behavior pattern recognition and analysis tool according to embodiments of the present invention.

FIG. 1 illustrates an overview block diagram of a target software behavior pattern recognition and analysis tool 100 according to embodiments of the present invention. FIG. 1 illustrates a representative computing platform 101, certain process steps executed thereon 190, and certain process steps 192 executed on a central server (not shown) in communication with platform 101. Target software, as defined herein, is a monitored software application running on hardware, and may also be referred to as a target software process, monitored target software, or an application instance. Target software 102 executes in conjunction with hardware 104. Each target software 102 contains an agent 106 for deriving a subset of measurements indicating the target software operational characteristics as illustrated in the process block diagram 190 of agent 106 in FIG. 1. Resulting examiner values 108 are transmitted to a central server, which is usually located in a separate location from the hardware 104. The central server performs the operations illustrated in process block 192, receiving the examiner values 108 from multiple agents 106, automatically deriving a baseline 112 from the received examiner values 114, and establishing a state of health of the target software based on comparing real-time measurements to the baseline at 116. Optionally, normalized gauge values and alerts for anomalies may be generated at 118 and 120, respectively.

Figure 2:
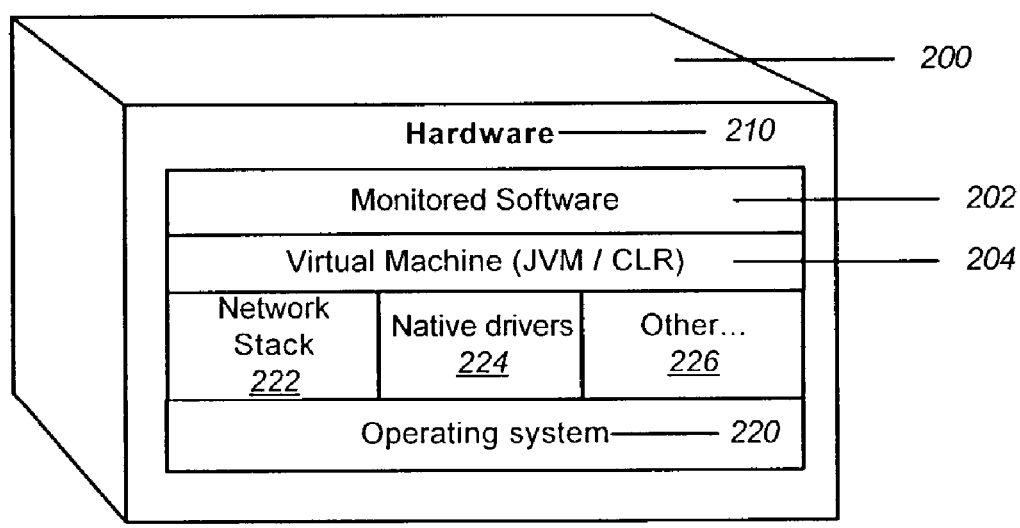
FIG. 2 illustrates an example machine configuration for target software being executed and analyzed according to embodiments of the present invention.

FIG. 2 illustrates an example computing platform 200 for running target software 202 according to a byte code embodiment of the present invention. Computing platform 200 corresponds to computing platform 101 of FIG. 1. Exemplary platform 200 contains hardware 210, target software 202 and a Virtual Machine environment 204 such as Java Virtual Machine (JAM) or a Microsoft .NET Common Language Run time (CAR). An operating system 220, network stack 222, native drivers 224, and other operating target software 226 components common to such an environment are also shown. Hardware 210 is a general purpose computer, well known in the art. Hardware 210 comprises (without showing) a CPU, memory, input/output circuitry and devices including, for example, network interface circuitry and mass storage devices. Representative mass storage devices may include both fixed media and removable media devices, and include a hard disk drive and optical disk drive such as a CD-ROM in the illustrated embodiment. The removable media mass storage device and its companion media are advantageously employed for the distribution and installation of software on the computing platform 200.

Note that not all of the components illustrated in FIG. 2 are essential, and embodiments of the invention could be implemented, for example, in a very small footprint embedded environment. One skilled in the art would understand that embodiments of the present invention are also applicable to other byte code and non-byte code run time environments.

Figure 3A:
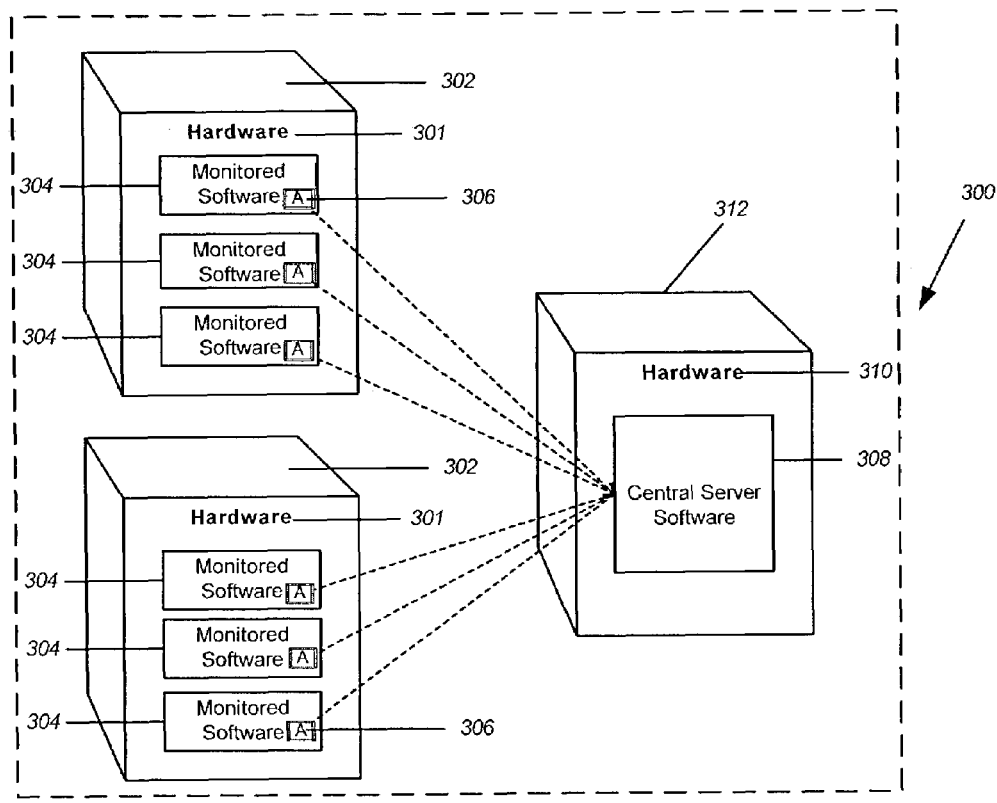
FIG. 3a illustrates the general operating environment of a target software behavior pattern recognition and analysis tool according to embodiments of the present invention.

FIG. 3a illustrates the a system configuration 300 of a target software behavior pattern recognition and analysis tool according to embodiments of the present invention.

Figure 3B:
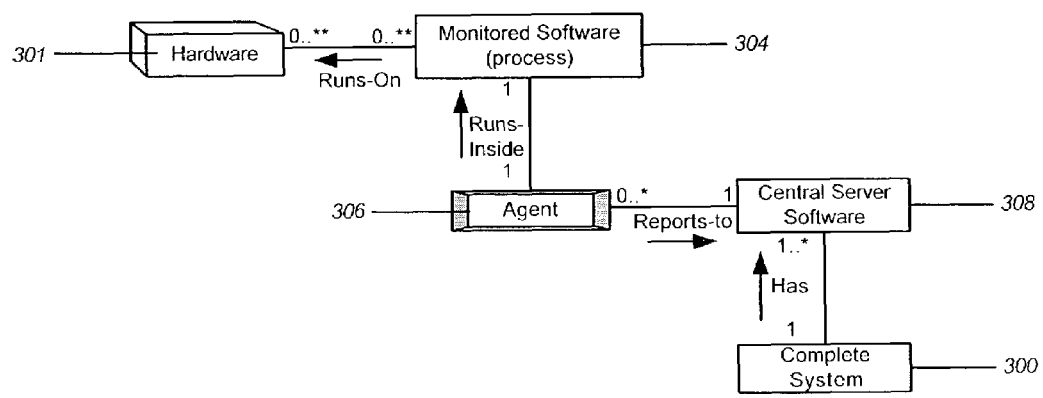
FIG. 3b is a concept diagram of the general workpiece of a target software behavior pattern recognition and analysis tool according to embodiments of the present invention.

FIG. 3b is a concept diagram corresponding to FIG. 3a according to embodiments of the present invention. One or more computing platforms 302, each containing computing hardware 301 and one or more pieces of monitored target software 304, which each have an embedded agent 306, are coupled to one or more central server platforms 312. Central server platform 312 comprises hardware 310 and Central Server Software 308.

In a preferred embodiment of the invention, computing platforms 302 may differ as to their hardware architecture and operating systems yet still communicate with a single Central Server 308. Accordingly, the chief component in the present embodiment that changes across hardware/software environments hosting monitored target software 304 is the agent 306. The central server 308 is independent of the operating environment of the target software 304.

Target software 304 represents one or more different target software types. Each running instance of target software 304 uses the agent 306 to collect and distribute behavior data. An example of a target software type would be a financial application that processes on-line loan requests. If this financial application was running on four computers and communicating with other applications, this would represent four instances of the target software type. Because the tasks performed by embodiments of the present invention may be too computationally expensive to run within the agent 306, these tasks (including pattern recognition and real-time comparisons to historical baseline data) are preferably performed in the central server 308, although they may be performed by the agent with a corresponding increase in agent overhead. In order for embodiments of the present invention to scale, multiple agents 306 can report to a single central server 308, and many central servers 308 can be aggregated to create a complete system 300.

(1) Executing Target Software on a Computer

Embodiments of the present invention monitor target software operational characteristics including, for example, performance speed and activity (i.e., usage count). Because target software is often unstructured and constantly changing (e.g. Changing frequency of subroutine calls), patterning of one measurement is often not meaningful. Therefore, preferred embodiments of the present invention generate vector measurements that can be patterned. Note that for clarity and in order to prevent obscuring an understanding of the invention, preferred embodiments are often described herein with reference to scalar (containing only the averages of code segment values), rather than vector, measurement. One skilled in the art will understand how to extend the description of scalar value embodiments to vectors (such as, for example a scalar examiner value and a deviant list, discussed intra).

Figure 4:
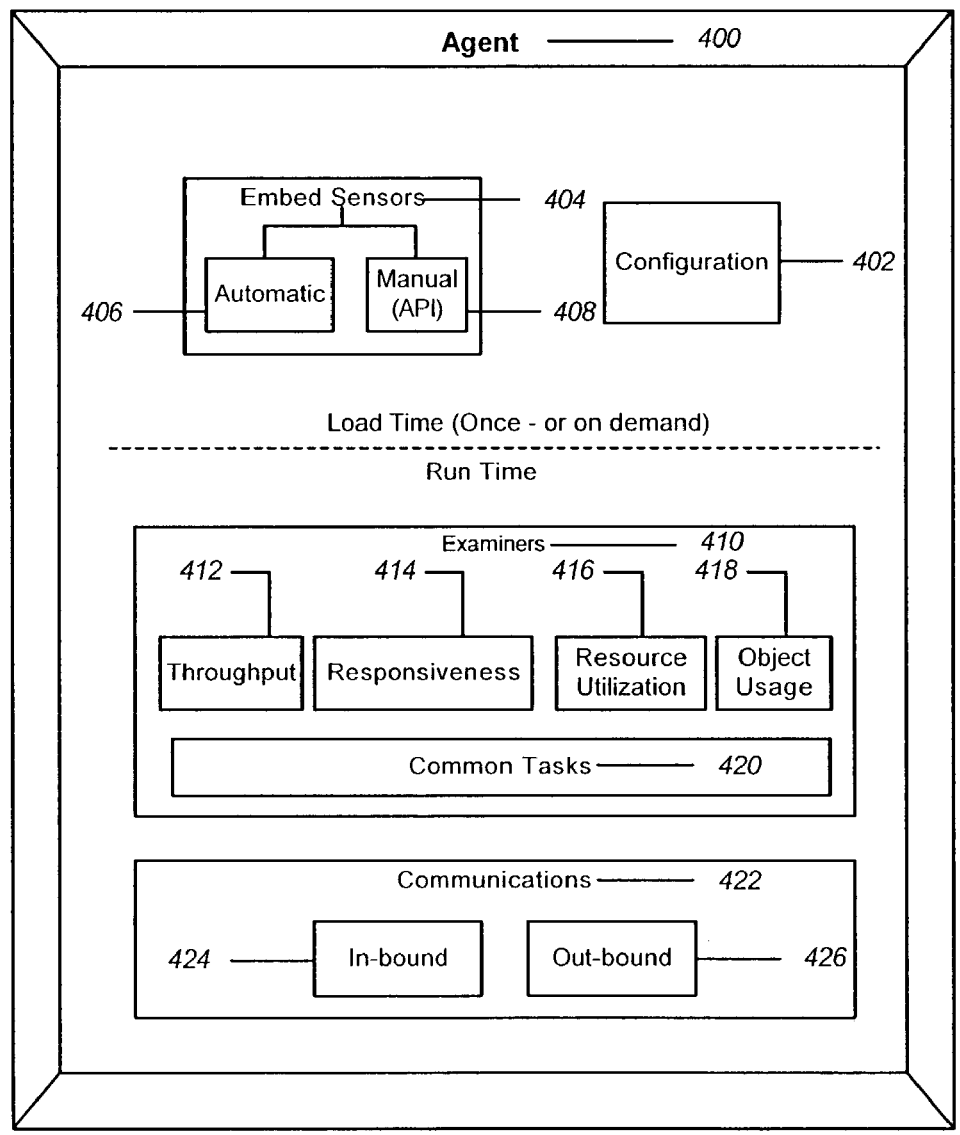
FIG. 4 illustrates an overview block diagram of an agent according to embodiments of the present invention.

(2) Deriving a Subset of Measurements Indicating Performance and Activity of the Target Software Overview of agents. FIG. 4 illustrates an overview block diagram of an agent 400 according to embodiments of the present invention. The agent 400 runs within a target software instance being monitored. The responsibility of the agent 400 is to provide sufficient information about the running state of the monitored target software so that the central server can establish baseline behavior patterns, detect and report on abnormalities in these patterns, and provide sufficiently detailed information to enable root-cause analysis or automatic remediation of the specific problem. Agents according to embodiments of the present invention support multiple software languages and environments and introduce a very small overhead (e.g., less than 1%) on the monitored target software, regardless of current resource constraints on the monitored target software. In addition, agent run time is self-governed to not exceed the stated resource consumption. In preferred embodiments of the present invention, broadcasting from the agent is sensitive to network load, and failure of the agent (or loss of connection to the central server) does not cause the monitored target software execution to be impacted above the mentioned constraints, because communications use bursts of UDP packets which do not overload the network IP stack in case of a communications failure.

The agent components are divided into two major categories: setup operations performed during load time or on demand, and constant operations performed during run time. Setup operations include the embedding of sensors into the target software and configuration actions (see block 122 of FIG. 1). One or more sensors are embedded into the target software at 404 to enable measurements of target software performance. A sensor is code that enables measurements such as how frequently a code segment is being called, how long it takes the code segment to execute, and the like.

Sensors can be embedded automatically during load time at 406. Preferred embodiments use this method of sensor embedding for programs in byte code formats such as JAVA and .NET. Automatic embedding eliminates the need for developer time, recompiling, and relinking. Sensors may also be embedded during compile or link time using application programming interfaces (APIs) at 408, or may be embedded during run time via dynamic linking or post linking as binary editing (techniques which are OS and CPU chipset specific). Preferred embodiments use these methods of sensor embedding for programs written in compiled languages such as C, C++, and COBOL.

The agent 400 is designed to support load time configuration via a local file 402. In addition, some configuration elements can be modified during run time from the central server on demand. The requests can be generated automatically based on central server requirements or based on authenticated user requests. In order to enable large-scale deployments, it is desirable to minimize the number of configuration parameters specific to a local copy of the agent. In the preferred embodiment, copy-specific parameters in the agent configuration file 402 are the monitored target software name (application name) and its group association (application type). Local configuration also may include parameters specifying agent activation (on/off), code segments that should be monitored, the examiner wait time before start, and a forwarding interval of information from the agent to the central server.

Constant operations include the collection of measurements from the sensors (see block 124 of FIG. 1) and communications with the central server. An example is illustrative to describe the function of examiners 410. A Java enterprise target software application can have approximately 28,000 code segments (methods) capable of being monitored. If each code segment is monitored for both execution frequency and time, 56,000 measurements are taken. However, as described above, the target software behavior pattern recognition and analysis tool of embodiments of the present invention does not record and output 56,000 measurements because this would consume too much memory and overhead. Instead, examiners 410 automatically reduce the number of measurements by generating a subset of measurements capable of indicating target software performance and activity, determine which sensors should be turned on or off and when, and determine what subset of available information needs to be transmitted to the central server. In other words, the examiners 410 are responsible for sensor activation modes and the generation of examiner values (see blocks 132 and 134 in FIG. 1). Each agent 400 contains at least four types of examiners—throughput 412, responsiveness 414, resource utilization 416, and object usage (for object-oriented target software) 418. Note that the object usage examiner 418 does not apply to all monitored software environments and is not always necessary.

Examiners share common tasks 420 and are run within a single application daemon thread. These common tasks 420 include controlling the sensor exploration mode (as described below) and controlling the sensor forwarding mode (as described below).

The agent 400 includes a communications subsystem 422 including inbound and outbound communications channels 424 and 426, respectively, to transmit examiner values to the central server and receive inbound information such as control commands to activate or deactivate certain sensors if the logic engine in the central server determines that more or less information is needed. Thus, the inbound and outbound communications channels provide a feedback loop for the target software behavior pattern recognition and analysis tool. In preferred embodiments, the outbound channel is a one-way transmission using UDP packets, which do not require overhead of management in case of network overload and/or central server unavailability. UDP is preferably used in order to eliminate network bottlenecks and buildups during "event storms" and other network problems. Note that packet loss of information send via this channel is generally acceptable. The inbound channel preferably utilizes TCP communications for incoming secure messages and the transfer of critical data that requires the guaranteed delivery of information. Such a communication system is described in U.S. patent application Ser. No. 09/596,763, incorporated by reference herein. However, it should be understood that embodiments of the present invention will also work over a serial port or other communication means.

The components of an agent will now be described in greater detail.

Sensors. Embedding of the sensors may vary between software languages and run time environments Rreferred methods for sensor embedding are performed during run time and require no code change by the developer or re-linking of the target software.

Figure 5:
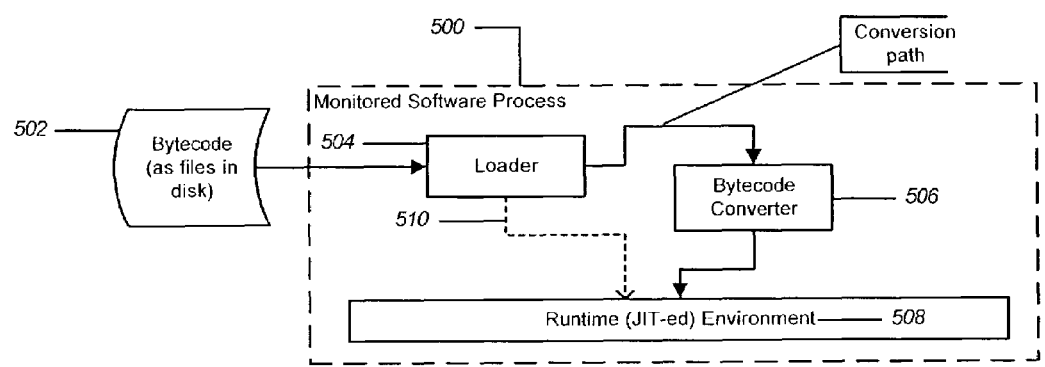
FIG. 5 is a block diagram illustrating an exemplary process of automatically embedding sensors into bytecode language target software.

FIG. 5 is a block diagram illustrating an exemplary process 500 of automatically embedding sensors into byte code language target software (which also corresponds to element 122 in the overview block diagram of FIG. 1). Each agent implementation is dedicated to a particular software language or run time environment. Examples include Java (with small variations between JVM-SUN1.3, IBM1.3, and the like) and .NET (for C#, VB.NET). In FIG. 5, byte code 502 to be monitored is loaded from storage media using a loader 504. During the loading of the byte code at 504, but prior to execution, the generic loader 504 provided by the run time environment provides hooks configured to invoke byte code converter 506 to embed the sensors into the code now loading for execution by the run-time engine. The code conversion occurs once during load time, which can provide greater efficiencies during normal code execution of the monitored target software. Note that in some cases (as determined during configuration), specific code segments may not be converted and therefore path 510 is utilized to bypass the byte code converter 506. For example, path 510 is followed in the instance of an object subject to serialization, or one that has been obfuscated.

With regard to measuring object utilization, some of the conversion is done at the Method level and some is done at the Class or Object level. The functionality is broken down into the following logical areas: specification of code to be embedded into every Method, specification of code to be embedded into every Class, collection classes that include information about the Classes and Methods that were converted, and configuration file information including which Classes to ignore (by name or when an interface is implemented).

A process of embedding the sensors in a Java environment according to embodiments of the present invention will now be described. Each Class or Object needs to be converted. A configuration file controls the deactivation of the entire configuration process. The following example describes the operation using the Java ClassLoader as a reference. This methodology may require changes based on other environment-specific implementations. (Note that in this case InstrumentConverter is a singleton class).

InstrumentConverter
instrumentConverter=InstrumentConverter.getInstance( );

```
// override the native defineClass0
private Class defineClass1(...) {
    if (!instrumentConverter.isActive( )) {
        return defineClass0(...); // ignore the transformation
    }
    // Convert the bytes - in this case of the entire class
    byte[] bytes = instrumentConverter.convert(...);
    return defineClass0(...);
}
```

Once a class is passed into the convert( . . . ) method, another set of tests verify whether the class requires conversion. These parameters are settable via configuration.

Embodiments of the present invention collect a relative number of class instances. This information enables the tracking memory leaks in an application. In order to accomplish this goal, special code has to be added to the constructor and finalize methods of the class. Note that some classes may not have an implementation of the finalize method. In such cases, the method has to be added with a call to the super.finalize( ). When a class is instantiated, all the constructors of the super classes are called. In order to maintain the correct object count, only the original class instantiated is counted. In order to provide the run time mechanism with this information, during class loading the class inheritance structure must be maintained.

Figure 6:
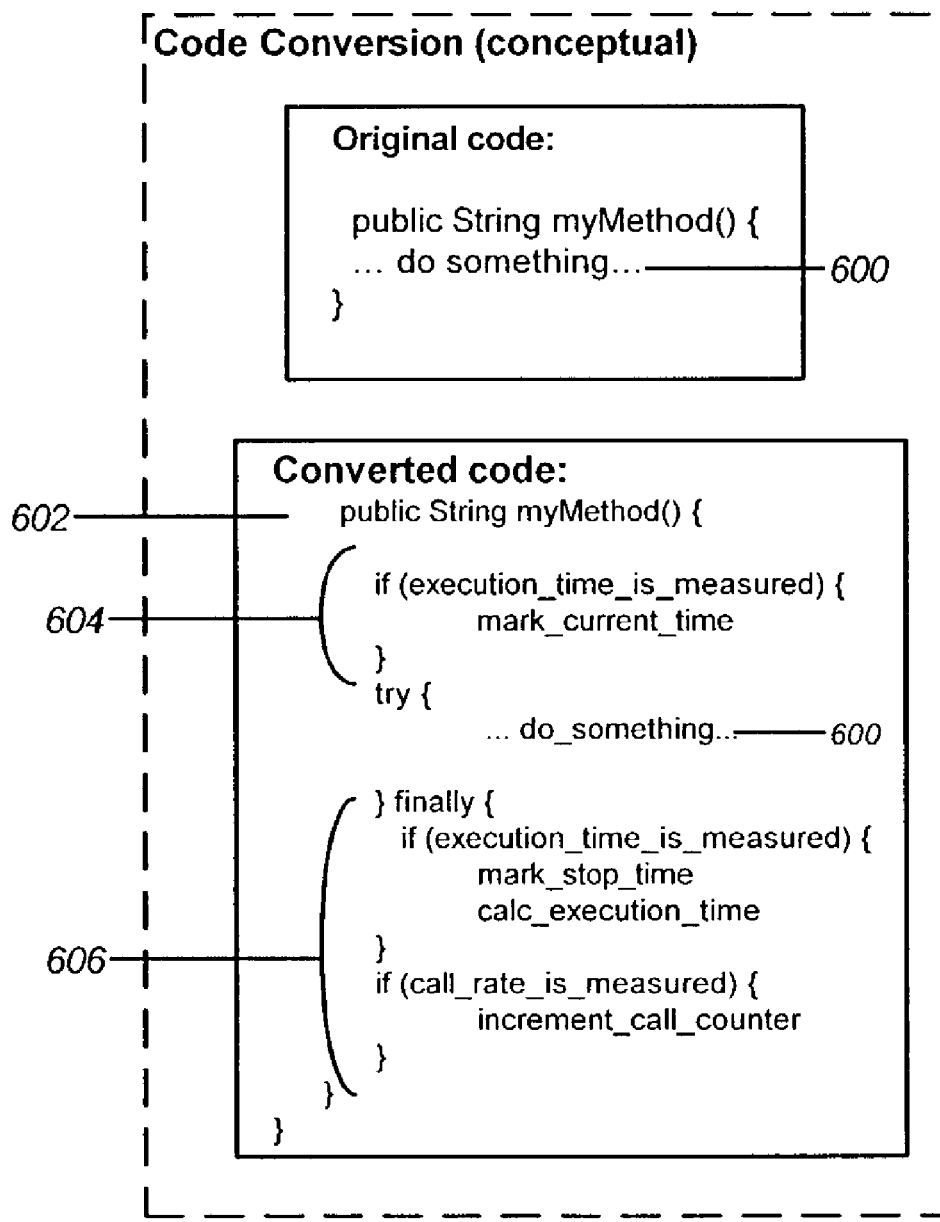
FIG. 6 is a conceptual example illustration of an original code segment and a converted code segment with an embedded sensor according to embodiments of the present invention.

FIG. 6 is a conceptual example illustration of a Java method 600 prior to conversion and the converted code segment 602 according to embodiments of the present invention. Note that the code illustrated in FIG. 6 represents what the converted code segment would look like if captured and reverse engineered, because code generation is performed at the byte code level and not at the source code level. As FIG. 6 illustrates, the effect of code conversion is that some extra sensor code is inserted at the beginning 604 and the end 606 of the original code segment 600. Language-specific measures may be taken to ensure that the code 606 is executed even if scenarios such as interrupts occur.

This implementation technique ensures that there are three levels of exploration and Forwarding that can be controlled: (1) all instrumentation is off; (2) only method calls are collected (light weight call); and (3) method calls and execution time are measured (most computationally expensive).

Note that the byte code implementation must take into account the size and locations of elements in the stack. Thus, when pushing a return element into the stack prior to handling the finally {} clause, the type of return must be established: (1) No return—nothing to the stack; (2) Byte (ARETURN); (3) Integer (IRETURN); (4) Float (FRETURN); (5) Double (DRETURN); and (6) Long (LRETURN). Updates to Byte code stacksize and maxLocals may be required depending on the code found and converted inside the method. Based on the reference Java implementation, this offset can be easily calculated and tested with tools such as the ILDASM for Microsoft .NET.

As noted above, for non-byte code target software languages, sensor embedding can occur during run time (operating system and processing hardware dependent), during link time or via automatic code generators prior to compilation. The techniques are similar to those described above for byte code conversion.

Originally, the inserted sensors are deactivated, and the examiner determines when and how to activate them.

For each code segment with an embedded sensor (a monitored code segment), it would be possible to collect the number of times the code segment is called and the execution time of each call into the code segment. However, in order to reduce the overhead of the sensors on the monitored target software, some of the embedded sensors may be turned on/off (deactivated) during run time. There are two activation modes for each sensor, exploration mode and forwarding mode. Exploration mode controls the measurement of the execution of code segments, and forwarding mode controls the distribution of the measurements.

The sensor exploration mode controls whether the execution information (the number of times the code segment is called and the execution time of each call into the code segment) is collected for each code segment (see element 124 in the overview block diagram of FIG. 1). Code segments that are determined too computationally expensive to measure are sampled instead of fully measured. For example, the length of sample time can be modified according to the target software execution environment. When computing resources are scarce, the sampling is reduced. Code segment exploration can operate in a "full" mode in which both the execution time and execution count are collected (highest measurement cost), a "count only" mode in which the execution count is collected but not the execution time (low measurement cost), and a mode in which no measurements are collected (no measurement cost).

The measurement of code segment activity is done according to the state of the monitored target software and in relationship to the hardware it is running on. In one example embodiment of the present invention, for code segments whose call rates exceed a threshold (e.g., ranging from 200 to 1000 and above calls/second), the explore mode is set to measure off and is only sampled periodically. For code segments whose call rates exceed a threshold (e.g. ranging from 10 to 100 calls/second) and whose execution time is below another threshold (e.g. ranging from 10 to 50 milliseconds), the explore mode is set to measure call rates only.

The example thresholds described above also describe acceptable ranges for Java applications running on single CPU servers. Deriving these thresholds is based on the amount of overhead the agent is allowed to consume from the monitored target software, and the speed of the CPU and the hardware platform. This latter value is determined by performing a simple benchmark test without the sensors and then with the sensor exploration modes. This simple test provides the data required to tune the system for a given hardware platform. Preferably, the system is tuned for maximum sensor resource consumption of approximately 3%, more preferably 2%, and even more preferably 1%.

It should be understood that the thresholds provided above are merely exemplary, and that the actual values used are subject to change according to the needs of the monitored target software and the overhead allocated to the agent.

The sensor forwarding mode controls how the execution information gathered during exploration mode is collected and distributed from the agent to the central server via the Agent communication sub-system. Code segment forwarding can operate in a "full" mode in which the execution time and execution count are transmitted to the central server, a "count only" mode in which only the execution count is transmitted to the central server, and a mode in which no information is transmitted to the central server. The determination of forwarding mode is done during run time by the examiner.

Examiners. The placement of examiners in FIG. 4 between the sensors and communication channels indicates that examiners play a role in communicating measurements from the sensors to the central server through the communication channels. Because there is a computational expense involved with taking measurements, and because some measurements are more expensive than others, not all sensor measurements should be taken at all times. For example, suppose that collecting a snapshot at the beginning and the end of a code segment costs about 0.5 ms of execution time. If this code segment is called a thousand times per second, the cost of measuring that code segment is 10 ms, which may be too expensive to measure. Alternatively, this code segment could be measured only some of the time. Thus, in embodiments of the present invention, measurement costs are part of the examiner's algorithm, and one function of the examiners is to identify the expensive sensors and determine which sensors are to be activated or deactivated, and when.

Initially, all monitored code segments may be observed. The examiners therefore periodically activate and scan the sensors to determine which subset of measurements needs to be taken and how they need to be taken. It is desirable to sweep the code segments on occasion because there may be an infrequently called code segment waiting to cause a problem. Only a small subset of information, having the information most meaningful to analyze performance, needs to be transmitted to the central server. In one embodiment of the present invention, performance is monitored such that the subset of information can be adjusted based on the performance of the target software. This can be done with low overhead (e.g. less than 1%) regardless of how much load is created by the target software.

Examiners according to embodiments of the present invention are capable of measuring a code segment from several different perspectives. By combining these perspectives, a baseline of the code segment can be generated. Each of these perspectives is handled by a separate examiner. One examiner measures how long it takes a code segment to run (responsiveness). Another examiner measures how many code segments are running, how frequently they are being called, and generally how busy the target software is (throughput). In other words, examiners are software that generates real-time values that provide adequate information for pattern matching, and that transmits those values to a central server for additional processing.

The third examiner measures resource utilization (activity), which is a function aggregating (e.g., by multiplication) the responsiveness and throughput examiners. Activity is the frequency of code segment invocations and preferably the pattern of those invocations. Note that activity is different from performance, which is the response time of code segment invocations and preferably the pattern of those invocations. The resource utilization examiner notes code segments that are called more frequently and take a significant amount of time to execute. For example, sometimes software bottlenecks occur in code segments that are called frequently but are executed in a relatively short period of time. These code segments would not be flagged by the throughput or responsiveness examiners, but would still have a large impact on the target software behavior. In another example, suppose 100 transactions are processed and a correct response is generated in 0.5 seconds. Now suppose that the processing of the 100 transactions results in 100 error messages being generated in 0.5 seconds. From a performance point of view, the two are identical. From an activity point of view, the two are different.

A fourth object usage examiner examines takes measurements from an object creation and removal point of view. This gives an indication of memory utilization for a selected set of objects. This examiner is optional in the preferred embodiment and only applies to object-oriented target software. A variation of this examiner looks directly at memory utilization or stack utilization values, as it applies to the operating environment of the monitored target software.

Figure 7:
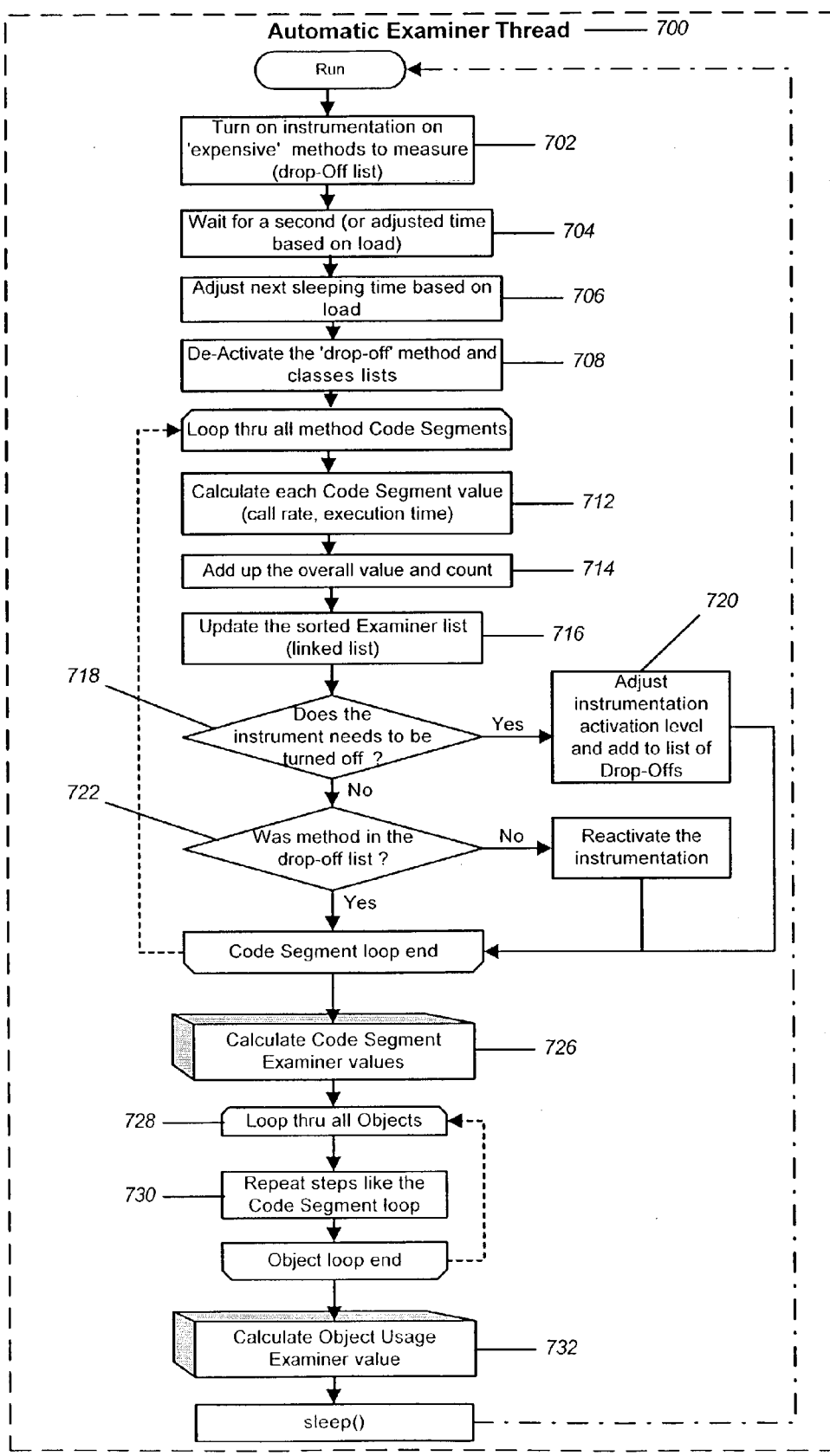
FIG. 7 is a flowchart representing an automatic examiner thread according to embodiments of the present invention.

FIG. 7 is a flowchart 700 representing an automatic examiner thread according to embodiments of the present invention (which also corresponds to elements 126 and 128 in the overview block diagram of FIG. 1). The execution of this thread can be controlled via local configuration or remotely from the central server via the inbound communication channel. At 702, 704, 706 and 708, the previously described sensor exploration mode is activated to take occasional measurements of expensive methods. Expensive methods are methods for which measurement would be computationally expensive, as will be described in greater detail with references to blocks 718, 720, and 722. For example, if it costs 1 ms of overhead to monitor a code segment that has a short, consistent execution time of 2 ms and is called over and over again, the cost of measuring this code segment represents a 50% increase in execution time. Given that the measured time is consistent yet the cost of measuring is expensive (50%), it is better to measure this method (code segment) only occasionally. Because of the measurement's cost versus consistency, it may not be necessary to measure how long this code segment took except only every once in awhile during low activity times to verify prior assumptions.

Thus, the sensors are activated at 702 only on "expensive" methods to occasionally measure (sample) how many times the method was called. The sensors are activated for a period of time (sleep time) at 704 to collect samples. This sleep time can be adjusted based on the current load (collection time decreases as load increases). Once the sleep time has elapsed, the sensors monitoring the expensive method are deactivated. Note that for inexpensive methods, the sensors may remain activated continuously. The frequency of sampling is also configurable and can dynamically change based on the activity level of the code segment. The sampled data is a running average. Blocks 702, 704, 706 and 708 together describe one automated sampling technique that may be used by embodiments of the present invention to sample the measurements instead of activating them continuously, which reduces the overhead of the agent. However, other sampling techniques fall within the scope of the present invention.

Note that because monitoring code segments is computationally expensive, as little processing as possible is performed when the code segments are sampled. However, during off-peak times, the call rate and execution times are calculated at 712 for the stored raw data of each code segment for each examiner type. For example, the call rate requires maintaining data on how many times the code segment was called, and dividing that count by the total test time. It is not desirable to perform this calculation in real-time, so it is deferred until off-peak times. In a preferred embodiment, this calculation is performed in a low-priority thread which the operating system or run time environment manages as described in block 706.

In 714, for each examiner type, embodiments of the present invention determine how many code segments were active, and averages and deviations are then computed. For example, the throughput examiner type will keep track of call rates and the responsiveness examiner will keep track of execution times.

In 716, the examiners keep a list of code segments which are "hot spots," code segments that may be called often and/or take a long time to execute. That list is sorted on the fly, with only a list of the most significant occurrences is maintained. Each examiner type has its own list. This method of sorting results in low overhead.

In 718, embodiments of the present invention determine whether the sensor needs to be deactivated based on the cost of using the sensor. There are three activation settings that can be changed depending on the run-time environment: off, call time only, and call time and execution rate. If the sensor needs to be deactivated, the instrumentation level is adjusted and the code segment is added to list of dropoffs at 720. Even if the sensor does not need to be deactivated, if it is determined at 722 that the method (code segment) was already in the dropoff list, it will not be immediately deactivated to ensure that it is sampled at some point (see "yes" branch in 722). However, if the sensor does not need to be deactivated and the method was not already in the dropoff list, then the instrumentation for that method will be reactivated at 724.

Examiner values for each examiner type are calculated at 726. The calculation of block 726 is performed separately for each examiner type, and a separate examiner list is maintained for each examiner type. Note that examiner values according to embodiments of the present invention may be scalar (a single value) or vector (multiple values). In one embodiment of the present invention, average code segment values are computed by adding up the measurements from the active code segments, and dividing the sum by the number of active code segments. For example, because the throughput examiner measures the execution time of each code segment, the average code segment value will be the sum of the code segment execution times divided by the count of active code segments. Note that other algorithms may also be employed to yield different and possibly more representative of the behavior of the application. For example, in some cases the sensor measurements used to derive the examiner value may be longer than the sampling cycle (e.g., the sensor measurements used may reflect the last 10 seconds, even though the sampling loop and examiner calculation cycle is only 5 seconds).

In addition to the computation of average code segment values, a deviant list (data far outside normal distributions) may be maintained separately (not averaged) so that the deviant values do not corrupt the normal data. For example, applications have a cleanup thread that may be executed once a day with a long execution time, and thus the cleanup thread will always appear at the top of a run time list. If these methods are added to the average code segment value, tit will be come unusable (in a graphical sense the examiner gauge will go to red for no reason). In order to deal with this issue, such deviant code segments could be detected, kept off the normal list, and added to the deviant list. The deviant list would become a part of the examiner value and would be parsed separately by the central server. Items that appear on the deviant list could be treated similar to other pattern items (i.e. if a code segment has been recorded several times as a deviant, the feedback will be less severe). Code segments in the deviant list may are only occasionally observed to ensure they are behaving as expected.

Steps 728, 730, and 732, which apply only to the object usage examiner, are executed only in certain cases. Note that step 730 is a repeat of previously described steps 702 to 724, except that instead of code segments, object segments are instrumented and measured with different sensors. Note that other types of examiners could also be applied, such as an I/O servicing routine software examiner.

Examiners are also responsible for transmitting examiner values to the central server. The agent and its examiners have no knowledge of past history. Rather, the examiners just transmit a vector examiner value to the central server that, over time, provides sufficient information for the central server to establish a baseline examiner value. This baseline may be used to determine if the target software is running normally or not. Once the baseline is established, the examiner can determine whether the current state of the target software is within normal bounds. Therefore, the transmitted examiner value is a real-time snapshot, a set of data that enables the server to determine if the target software is running within normal bounds.

Each examiner type is responsible for generating real-time values that provide the central server with enough information so that pattern matching and analysis can be performed. These values are transmitted to the central server via the agent communication sub-system (see 422 in FIG. 4). In a preferred embodiment, these values include the number of code segments that are currently being used, the number of code segments that are too expensive to measure (see exploration and forwarding modes), and examiner statistics (average of the code-segments, total code segments used for calculation, and standard deviation within the code-segment average), which are calculated separately for each examiner type. In addition, each examiner type can publish the list of "hot spots" in a textual form for human analysis, activate the sensors within the list according to run time status, or generate meta-data about the execution based on examiner type.

All examiners are configured to examine a specific subset scope of monitored code segments. A subset scope can be defined as packages, namespaces or other object/class aggregates such as code segments that the execution path passes through, up to a configurable number of levels. Subset scope examiners focus on specific areas of code (i.e. the examiner list will be limited to code segments from a specific code area), which can provide greater detail for problem source identification. In particular, automatic examiners start as high-level examiners (i.e. they look at code segments for multiple examiner types). Subset scope examiners are automatically created when the high-level examiner list is overloaded with a specific code segment. The number of reduced scope examiners can be controlled by the configuration, or configured for the application type and activated via the communication channel to the central server as described in FIG. 10 at 1006. In addition to automatic examiners, custom examiners can be manually configured to a specific examiner type within a defined subset scope (using the same communication technique described at 1006).

Figure 8:
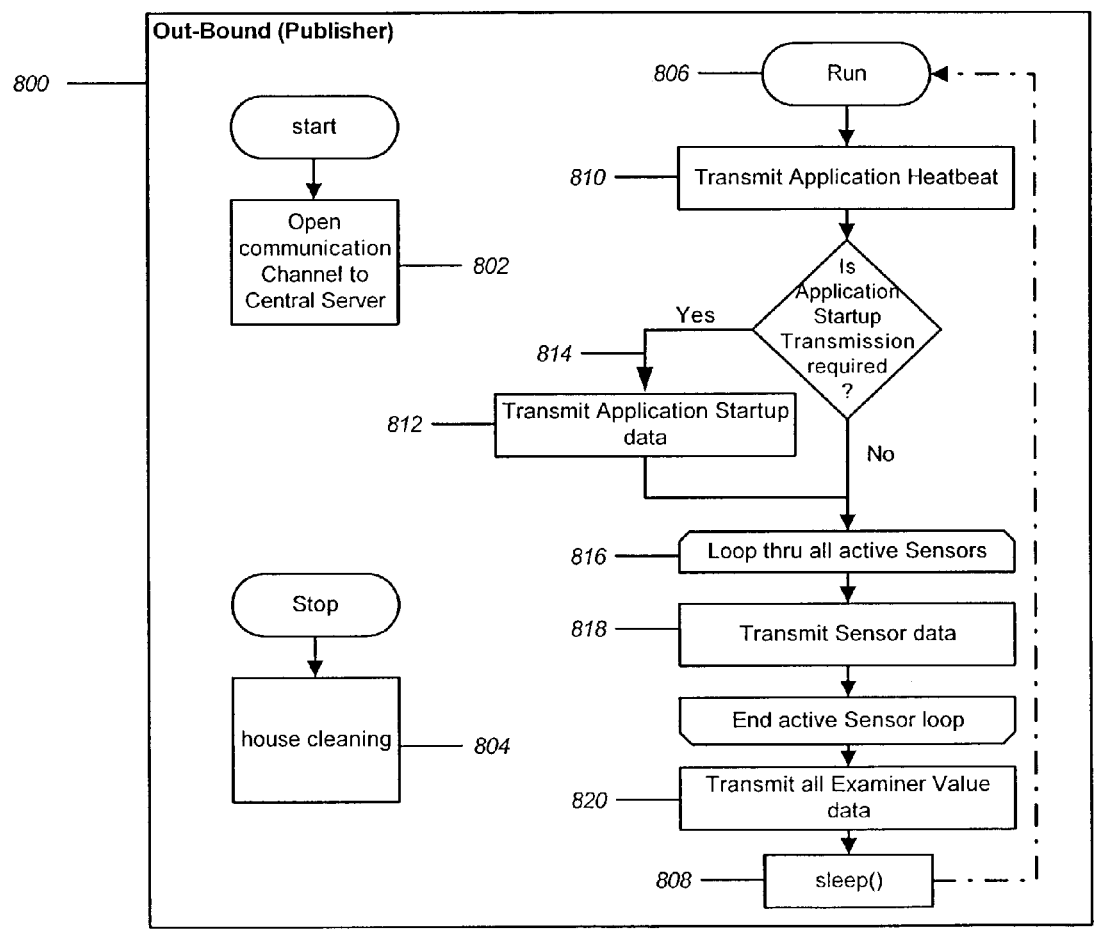
FIG. 8 is an exemplary flow diagram of an outbound communication channel of an agent according to embodiments of the present invention.

Communication channels. FIG. 8 is an exemplary flow diagram of an outbound communication channel thread (a dedicated daemon thread) according to embodiments of the present invention (corresponding to block 126 in FIG. 1 and block 426 in FIG. 4). Information transmitted from the remote agent to the central server is defined by a unique name within the target software instance being monitored by the agent. This is true for multiple information types, which include instrument data and examiner values. Instrument data refers to information generated from a sensor, examiner, or a programmable application programming interface (API), and which contains a unique reference name (data channel). An instrument has a name/value pair.

The examiners according to embodiments of the present invention transmit their examiner values from an automatically derived subset of sensors to the central server. This is described in U.S. patent application Ser. No. 09/596,763, the contents of which are incorporated by reference herein.

The out-bound communication channel preferably runs in a dedicated thread 800. During initialization, a communication channel is established at 802. During termination, a network cleanup is performed at 804.

During a run loop 806, transmission is enabled in accordance with configuration parameters for a dedicated interval enabled during sleep at 808. The thread startup and interval are configured in order to allow optimum resource utilization and problem source detection via the central server. Configuration is performed via a local file and can be modified during execution via the in-bound listener described below.

Every transmission cycle can contain several packets of information. An application heartbeat packet 810 is sent more frequently than other packets (e.g., a short sleep time transmission of heartbeat data may occur every cycle, with all other transmissions occurring every fourth or fifth cycle). Although not shown in FIG. 8, control of the application heartbeat packet 810 is well understood by those skilled in the art. It provides the central server a heartbeat of the application (target software). This heartbeat is used in order to provide early detection of failure. This packet may include memory usage of the target software or other general run time data. An application startup transmission packet 812 occurs during application startup, during infrequent time intervals and after the agent has recovered from a failed communication with the central server at 814. The packet contains run time information required by the central server such as start time and in-bound communication channel information. This transmission enables the central server to locate the listening port information for the agent (because many agents can share the same hardware, and port sharing is not permitted).

For Active Sensors at 816, the sensors values are sent to the central server at 818. In order to increase system efficiency, sensor data may optionally only sent when the sensor is active and the sensor data has been modified since the last transmission. Examiner values are transmitted at 820.

Figure 9:
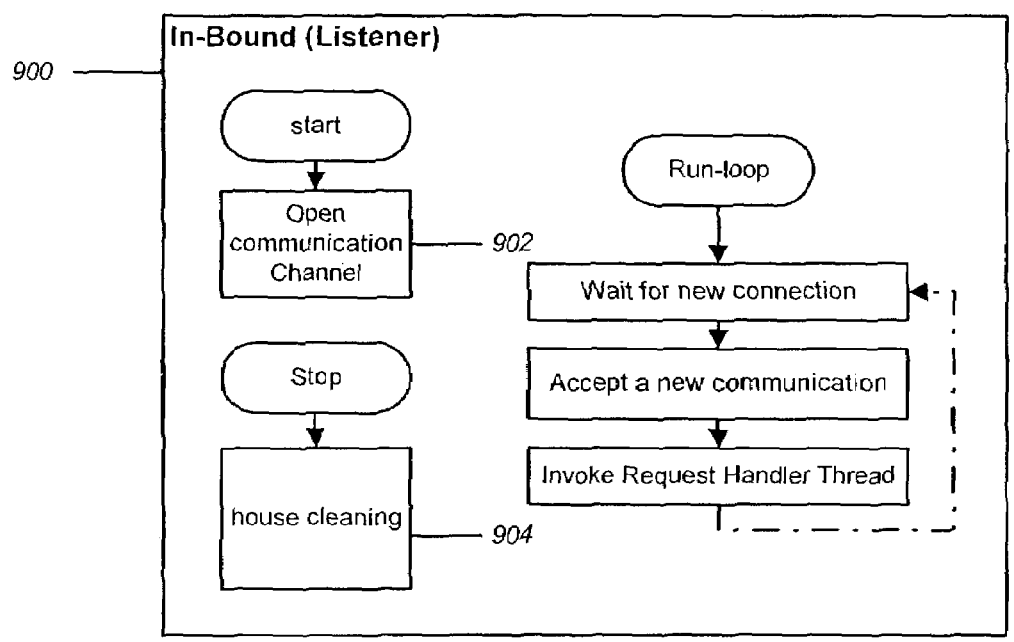
FIG. 9 is an exemplary flow diagram of an inbound communication channel of an agent according to embodiments of the present invention.

FIG. 9 is an exemplary flow diagram of an inbound communication channel thread (a dedicated daemon thread) according to embodiments of the present invention (corresponding to block 424 in FIG. 4). Note that the feedback path functionality represented by FIG. 9 is not explicitly shown in overview diagram FIG. 1. Preferred embodiments include the feedback path to allow the central server to adjust the agents. This is useful, for example, in order to derive the subset of code segments used to generate the baseline The inbound communication channel is the feedback path.

The inbound communication channel preferably runs in a dedicated thread 900. During initialization, a communication channel is established at 902. During termination, a network cleanup is performed at 904. Note that the inbound communication channel (port) is determined during run time because many agents can share a single network stack. This channel (port) information is sent to the central server via the application startup information packet. In one embodiment of the present invention, when opening a communication channel at 902, this component will scan the available channels (ports) and will select an available one. In general, the in-bound communication listener 900 enables a feedback loop to the central server and enables users to request information from the agent or modify its run time configuration as needed. In addition to the preceding description of a preferred embodiment of a communication channel, other communication channels, as defined herein, may be employed with embodiments of the present invention including, for example, RMI, NET remoting, CORBA, and the like.

Figure 10:
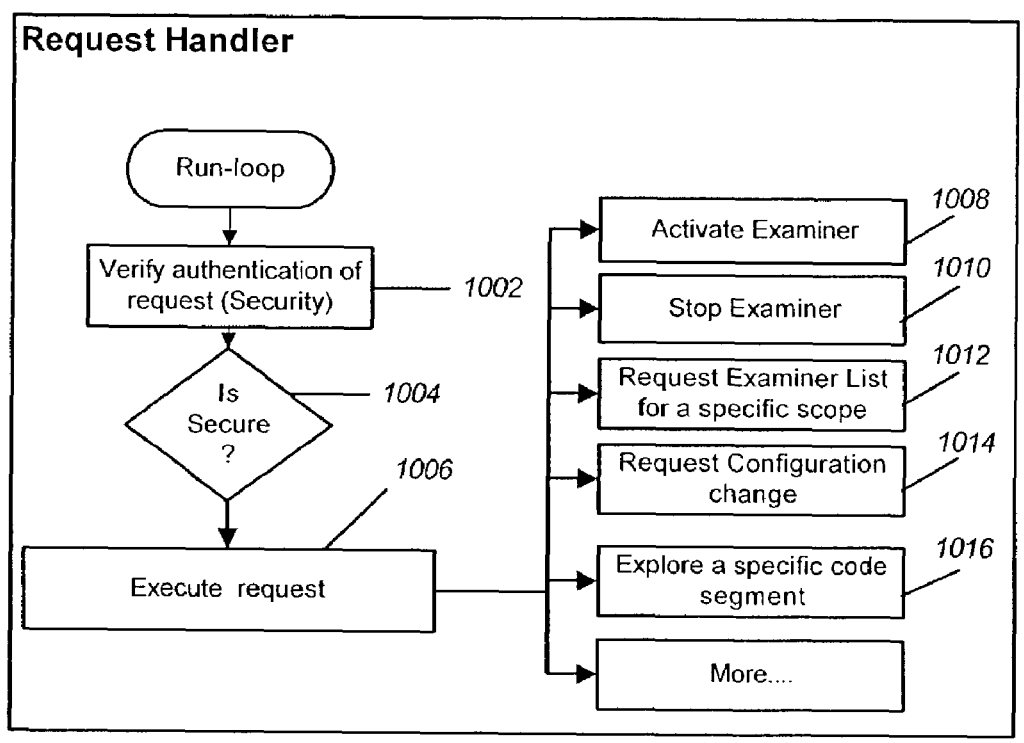
FIG. 10 illustrates the process of handling a new request via a request handler according to embodiments of the present invention.

FIG. 10 illustrates the process of handling a new request according to embodiments of the present invention. Each request is authenticated at 1002. Note that requests are authenticated via the central server, and that the authorization mechanism described herein is only between the agent and the central server. Once requests are verified as secure at 1004, the requests are executed at 1006. These requests can be extensible and vary according to the target software environment. In addition, customized handlers can be used based on industry standards (such as servlets in Java environment). Example actions can include activating a specific examiner (or change its scope) 1008, stopping a specific examiner 1010, requesting a detailed human-readable examiner list for a given scope (a drilled down examiner list) 1012, and requesting a configuration change (such as a transmission interval or an examiner sampling interval) 1014. A specific code segment may be explored at 1016 in real-time without interfering with the examiner activities.

(3) Automatically Deriving a Baseline from the Subset of Measurements

As illustrated in blocks 128 and 130 of the overview block diagram in FIG. 1, after the raw examiner values and selected sensor data are transmitted to the central server, they are stored in a database. In accordance with these new values, the baseline may be updated. Note that not every raw examiner value may be used to develop the baseline. Rather, the baseline is updated only at certain times. The central server then establishes a state of health of the monitored target software based on comparing real-time measurements to the baseline at 116. Optionally, normalized gauge values and alerts for anomalies may be generated at 118 and 120, respectively.

Figure 11:
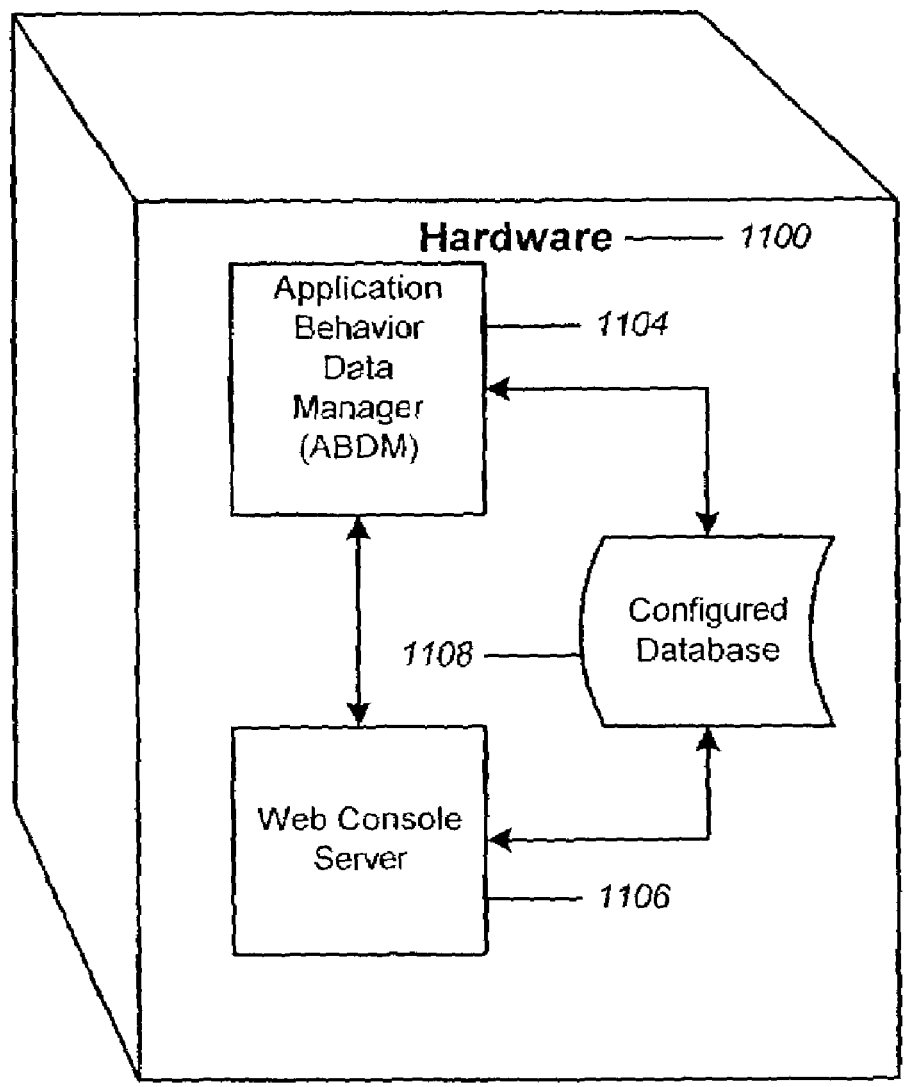
FIG. 11 is a block diagram illustrating central server components according to embodiments of the present invention.

FIG. 11 is a block diagram illustrating the main central server components according to embodiments of the present invention. The central server 1100 includes three components, the Application Behavior Data Manager (ABM) 1104, the Web Console Server 1106, and the Configured Database 1108. These three components are separate software processes. Any one of these processes may run on the same hardware or dedicated hardware.

Figure 12:
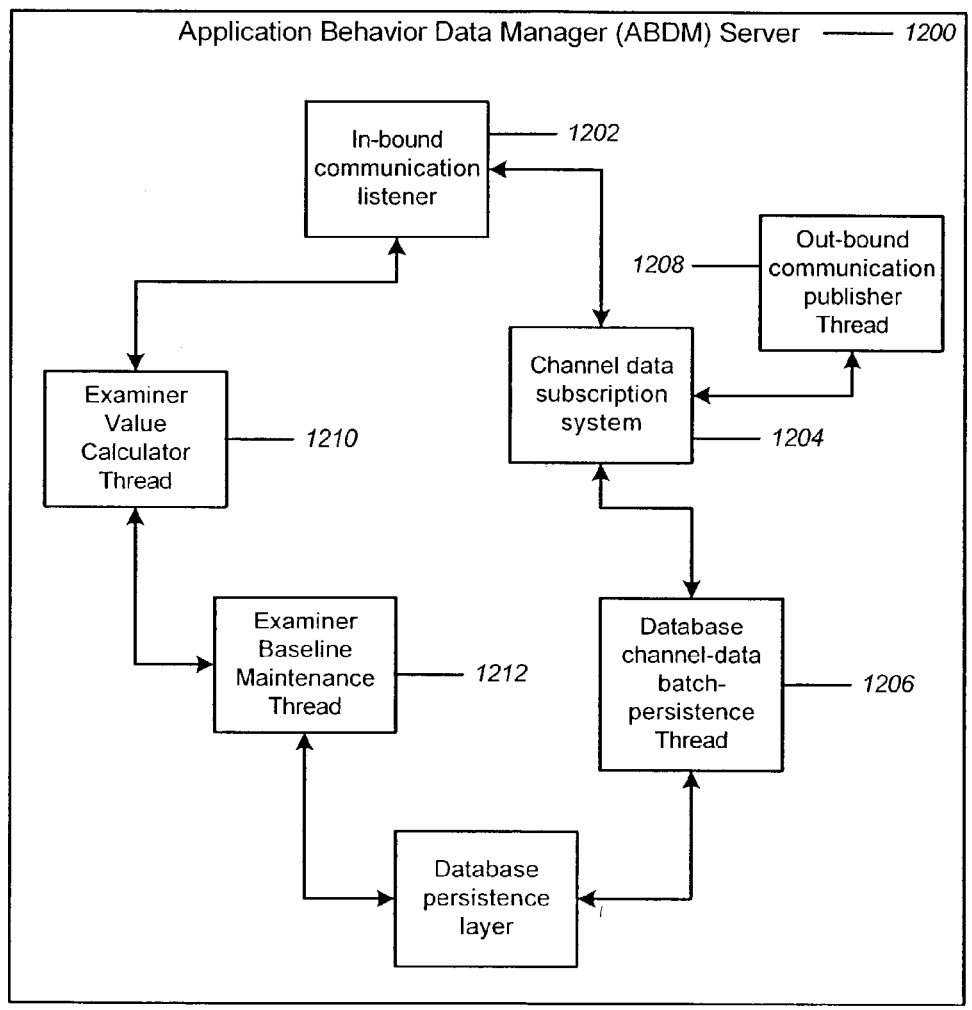
FIG. 12 is block diagram illustrating the functional blocks of an application behavior data manager (ABDM) according to embodiments of the present invention.

FIG. 12 is block diagram illustrating the functional blocks of the ABM 1200 (corresponding to block 1104 in FIG. 11) according to embodiments of the present invention. Data from the agents is routed through the ABM, and behavior analysis, data persistence and alert generation is performed in the ABM. Data persistence, as defined here, is the long-term, permanent storage of data in a medium. The inbound communication listener 1202 is described in U.S. patent application Ser. No. 09/596,763, incorporated by reference herein.

In FIG. 12, raw examiner values are received in the inbound communication listener 1202 and are stored in a first linked list without averaging. This first linked list is read by the examiner value calculator thread 1210, which calculates the normalized examiner values and generates a second linked list of normalized examiner values. The second linked list of normalized examiner values is then read by the examiner baseline maintenance thread 1212. In the channel data subscription subsystem of 1204, also described in U.S. patent application Ser. No. 09/596,763, every piece of data is a subscribable entity available to the remediation engine and the gauges. In block 1206, data is stored into the database offline (not in real time) to maintain high throughput.

In the instrument publisher thread 1208, the outbound communication channel can publish a subscribable value such as a gauge value or normalized examiner value to another component such as an alert engine, which can issue a notification of anomalous operation. Note that the normalized examiner value is the deviation from normal baseline data as computed by the ABM server. The instrument publisher thread 1208 determines the need and timing of calculations. Because the vast majority of data is not significant, embodiments of the present invention assume normalcy and do not generate alerts unless an anomaly is located. Alerts and gauges subscribe (register and listen to) the data they require and only subscribed data is calculated.

In the examiner value calculator thread 1210, raw examiner data received from the examiners is parsed, and normalized examiner values are created. The normalized values feed the gauges, the alert system, and the examiner baseline maintenance thread 1212 through a linked list of objects. The examiner baseline maintenance thread 1212 receives the normalized values and determines when and if the baseline is to be updated in the database. Note that although the examiner value calculator thread 1210 and the examiner baseline maintenance thread 1212 are described as threads, in alternative embodiments they may be performed in-line.

Figure 13:
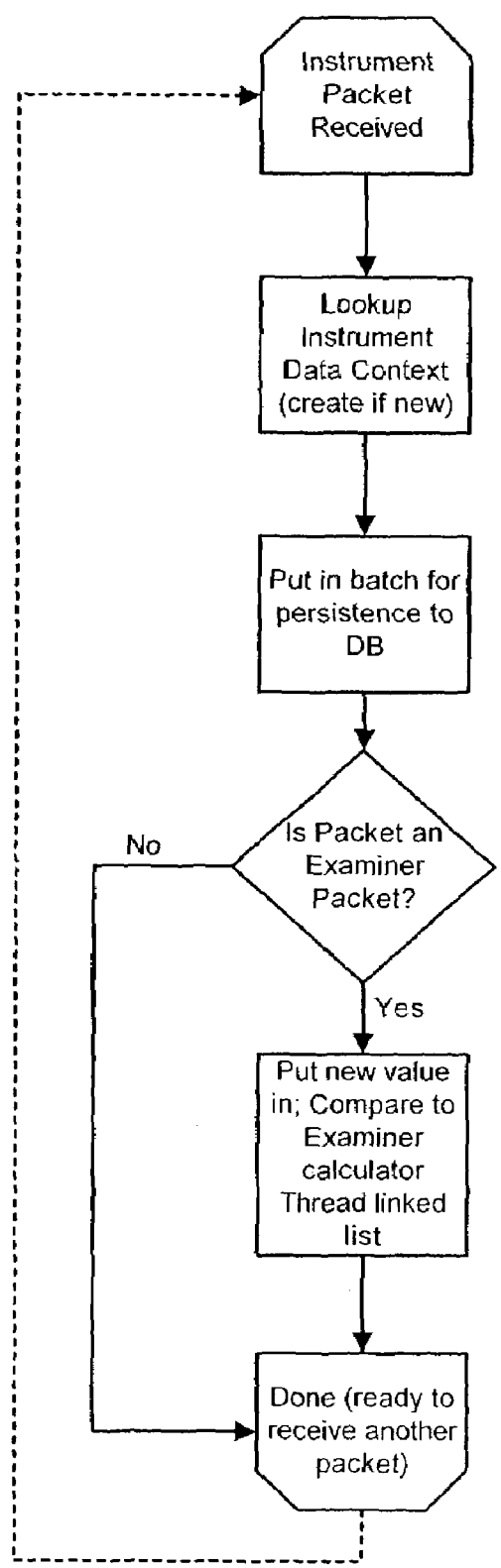
FIG. 13 is a flow diagram illustrating an inbound communication listener.

FIG. 13 is a flow diagram illustrating the inbound communication listener 1202 of FIG. 12.

Figure 14:
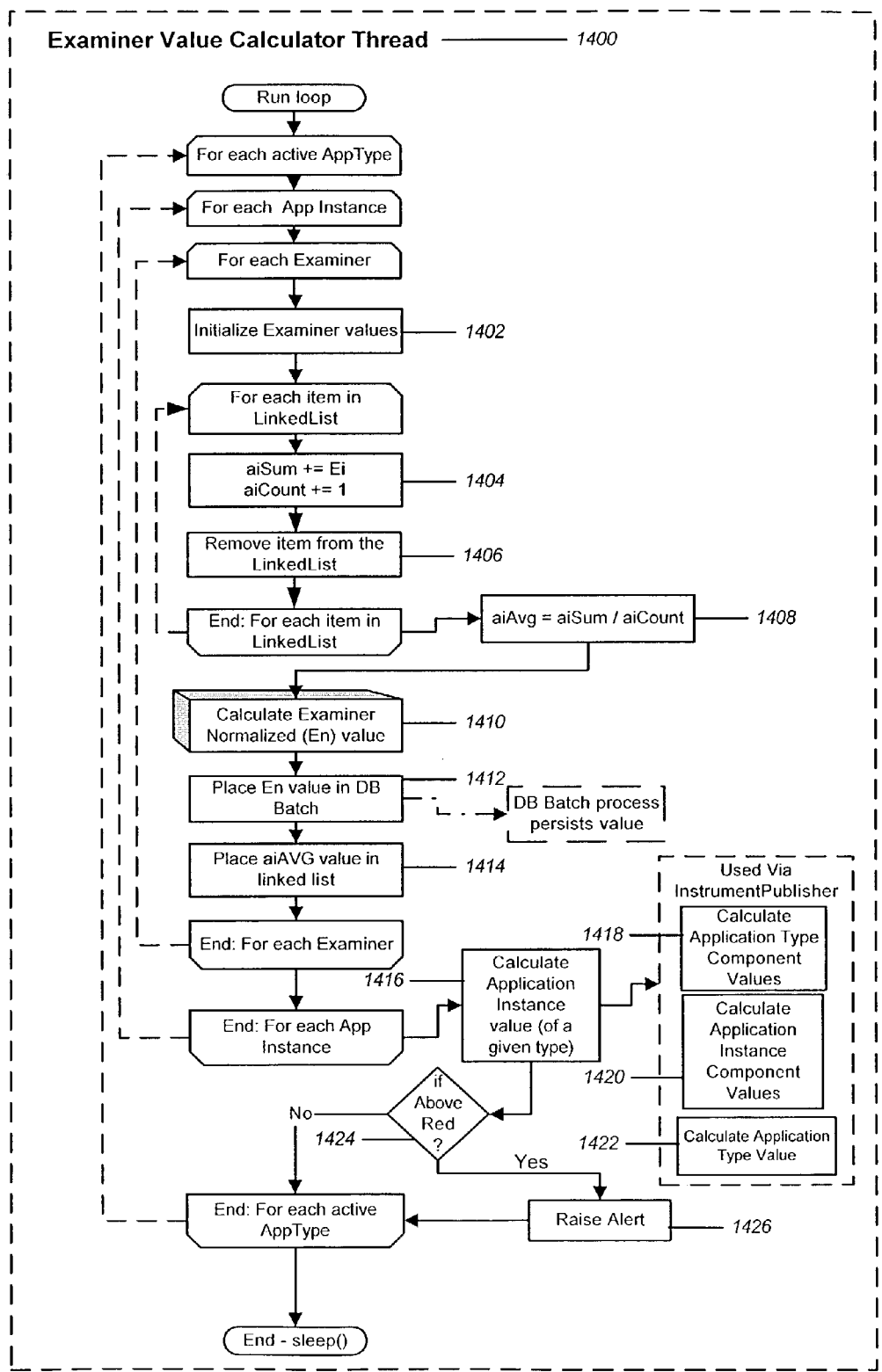
FIG. 14 is an exemplary flow diagram of an ABM examiner value calculator thread for creating normalized examiner values according to embodiments of the present invention.

FIG. 14 is an exemplary flow diagram of the ABM examiner value calculator thread 1400 (corresponding to block 1210 of FIG. 12) for creating normalized examiner values according to embodiments of the present invention. This thread maintains current (normalized) values for different examiner types for the monitored target software instances and compares them to the stored behavior baselines. Note that the ABM examiner value calculator thread 1400 runs for an adjustable data collection time period which is sufficient to provide up-to-date normalized gauge values to subscribers. In FIG. 14, for every active application type, instance, and examiner type, the examiner values are first initialized at 1402. Note that application types are typically declared via the agent configuration file. Next, for each item in the linked list of items received in real time during the data collection time period (the individual target software instance examiner raw values), the values are added and counted at 1404 then removed from the list at 1406. In one embodiment, the last item in the linked list is marked to bound the iterations. Note that in block 1404, Ei is an individual monitored target software examiner raw value. These Ei values are provided by the instrument data packet handling thread as shown in FIG. 13. The values are then averaged at 1408 to generate averaged raw examiner values. In 1408, aiAvg is the average value for the examiner monitored target software instance values. Before normalized examiner values can be computed at 1410 by comparing the averaged raw examiner values to the examiner baseline values, generation of the examiner baseline values will be discussed.

Figure 15:
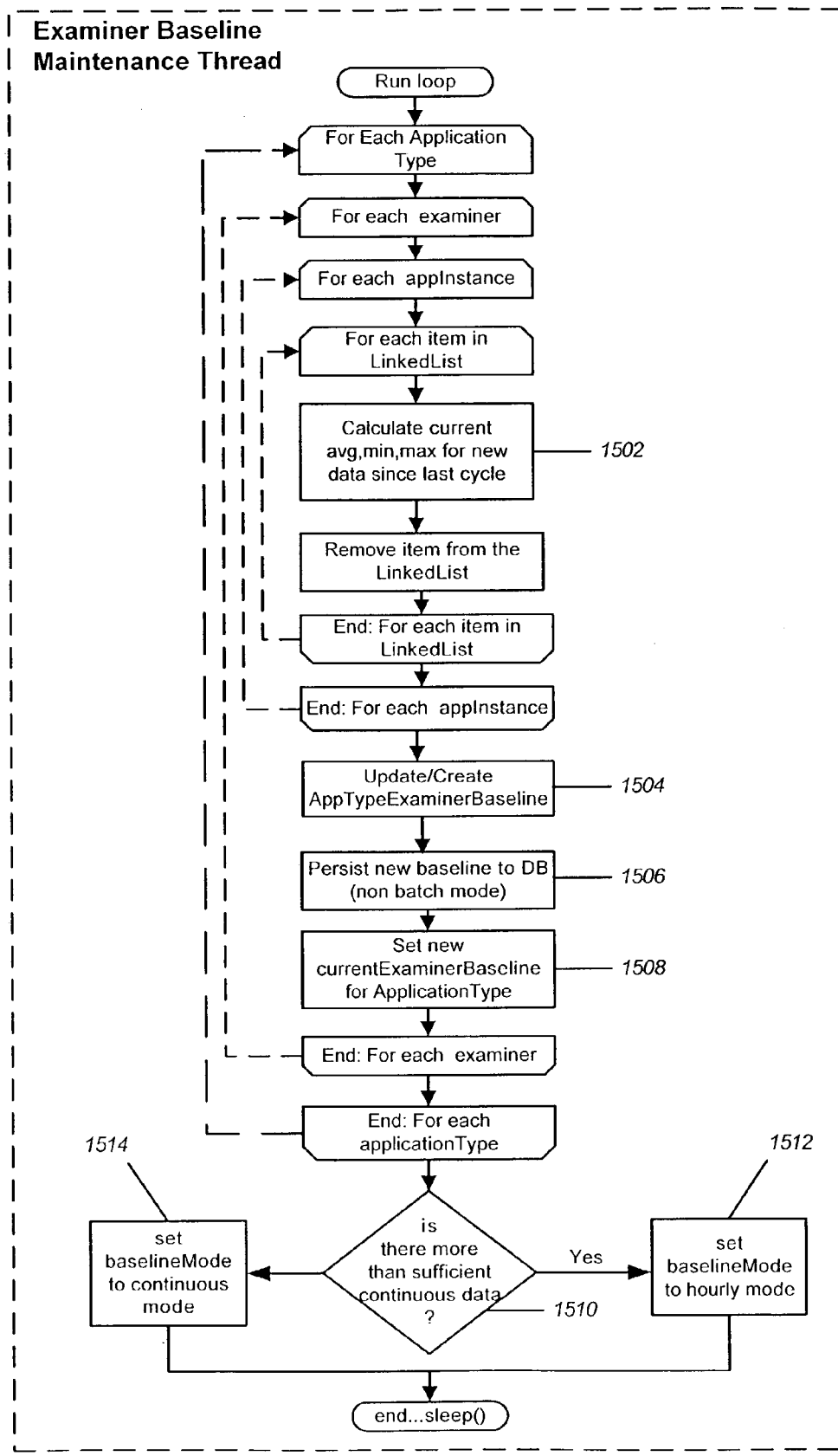
FIG. 15 is a flow diagram illustrating an ABM examiner baseline maintenance thread according to embodiments of the present invention.

FIG. 15 is a flow diagram illustrating the ABM examiner baseline maintenance thread 1500 (corresponding to 1212 of FIG. 12) according to embodiments of the present invention. This thread maintains a set of monitored target software type examiner baseline objects, one for each time duration X going back Y days (e.g. one for each hour over the last 24 hour period), and one for a continuous time duration. In FIG. 15, for every application type, examiner type, application instance, and item in the linked list of normalized examiner values (in one embodiment, the last item in the linked list is marked to bound the iterations), the ABM examiner baseline maintenance thread 1500 calculates an average, minimum and maximum value for the new normalized examiner data received during the current data collection time period at 1502, removes the new normalized examiner data from the list, and either creates or updates the target software type examiner baseline at 1504 taking into account the stability of the baseline (in other words, if the baseline is based on a large amount of historical data, the average, minimum and maximum value for the new normalized examiner data will have less effect on the baseline than if the baseline was based on a relatively small amount of historical data). The ABM examiner baseline maintenance thread 1500 then stores the new or revised baseline into the database at 1506. This includes the new value for the current time period and the continuous value. The duration of the data collection time period is preferably one hour, starting on the hour, but may be as frequent as needed to provide up-to-date normalized gauge values to subscribers based on cycles of increased usage activity occurring over hours, weeks, months, or the like.

At 1508, a new current examiner baseline is established for each application type depending on whether the mode is 24 hour or continuous, as described in further detail below.

In one embodiment of the present invention, the ABM examiner baseline maintenance thread 1500 selects the baseline mode to be 24 hour or continuous depending on the amount of data collected. Blocks 1510, 1512, and 1514 in FIG. 15 provide an example mode selection process. If the ABM examiner baseline maintenance thread 1500 detects that more than 3 days of data are present at 1510, there is enough data to create an hourly baseline and enable subsequent received data to be compared to hourly baselines, so the mode is set to hourly mode at 1512. If less than 3 days of data are present, the mode is set to continuous mode. This can be overridden by the monitored target software type configuration. For example, for the hour-of-day mode, three days (three sampling cycles) are generally sufficient. Note that embodiments of the present invention also include multiple baselines, each specific to a particular duration, such as time-of-day, time slots, day-of-week, and other calendar-based groupings.

(4) Establishing a State of Health of the Monitored Target Software Based on Comparing Real-Time Measurements to the Baseline Once the examiner baseline values have been computed, these baselines can be compared to the real-time averaged raw examiner values for a particular target software instance to generate normalized examiner values (see block 116 in overview flow diagram of FIG. 1). Referring again to FIG. 14, the normalized examiner values are calculated at 1410. A comparison is also made to the deviant list, which in preferred embodiments contains identifiers of code segments and corresponding measurement values (execution time and resource utilization, but not execution count). Items on the deviant list are attached to the target software type for a specific examiner type. Misbehaviors (which are part of the gauge value calculation) take into account the number of times an item has appeared on the list historically and the amount of historical data gathered to date. Thus, if a code segment measurement value has appeared on the deviant list many times, that event is recorded, but is determined to be normal. Users of this invention can query the system for its deviant lists and deal with them at any time, without requiring false alert generation. Note that the deviant list is part of the examiner value vector, but is not included as part of the average examiner code segment value.

In one embodiment of the present invention, normalized examiner values may be calculated in 1410 as $$En=(aiAvg-Ea)/Ea,$$

where En=normalized target software instance examiner value (used for the Gauge), Ea=the baseline, and aiAvg=average value of the examiner target software instance values (see block 1408 of FIG. 14). Other gauge values may be derived using the same guidelines. Note that other algorithms may also be employed.

Note that FIG. 14 represents a simple example where a single raw examiner value is received from the agent and is averaged. However, in an alternative implementation, vector values are received instead of scalar values. In such a case, blocks 1404-1408 are adapted to incorporate processing of the vector value. In a preferred embodiment, processing of a vector results in the production of a single, scalar value to characterize performance in order to simplify comparative analysis using the value, such as against thresholds for alarm generation, and to simplify data presentation such as with a gauge value (described later in reference to FIG. 16).

The normalized examiner values are then put into a batch at 1412 to establish a record of what has been calculated, and put into a linked list at 1414 for use by the examiner baseline maintenance thread (see block 1212 of FIG. 12). The linked list is used in the baseline maintenance thread, and is available for subscription.

The human-readable target software instance examiner gauge (instrument) value for the particular target software instance is also computed at 1416. Note that because the monitored target software has individual components (examiner types), one target software instance examiner gauge value is calculated for each examiner type.

Figure 16:
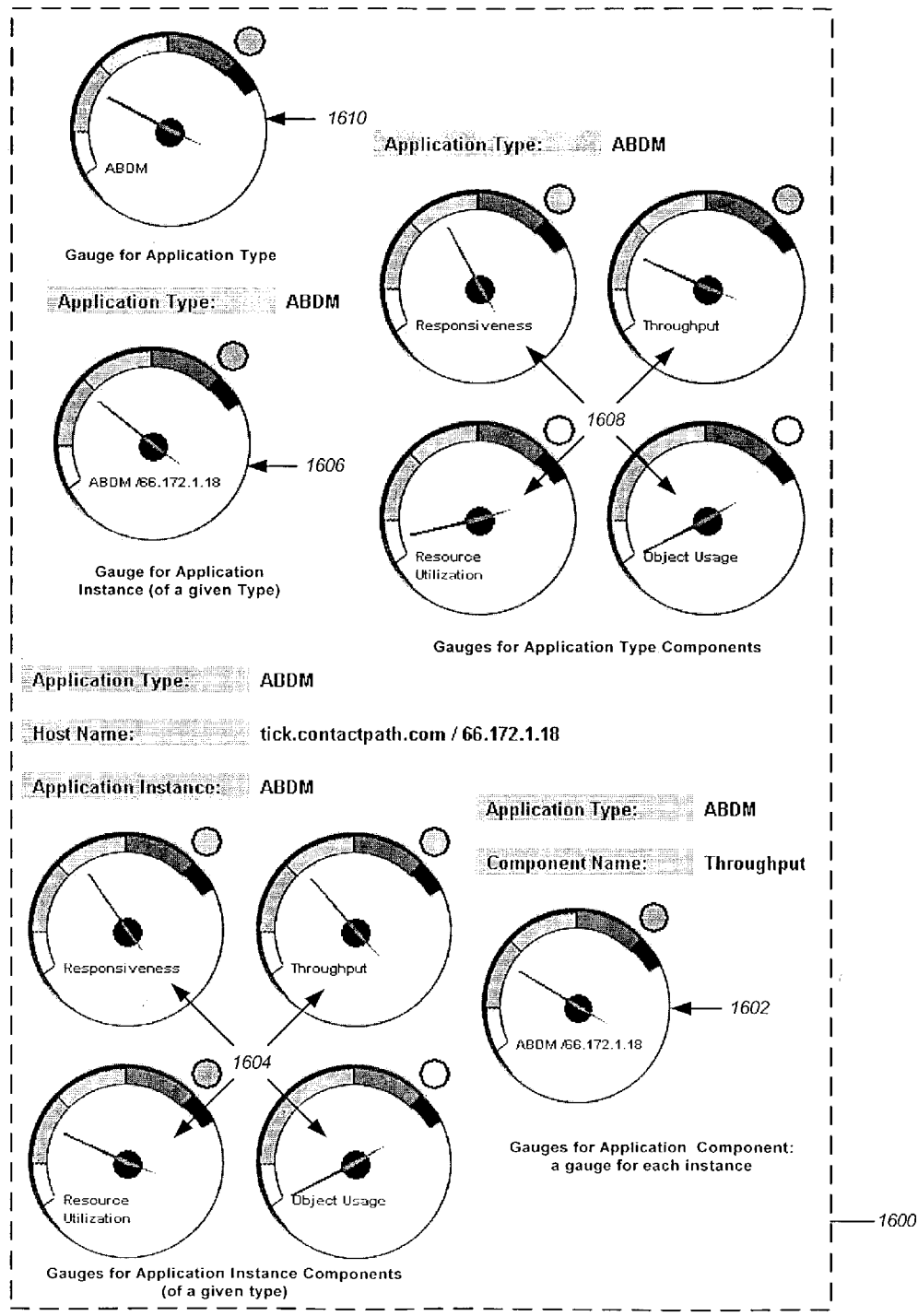
FIG. 16 is an exemplary illustration of gauges that may be displayed according to embodiments of the present invention.

FIG. 16 is an exemplary illustration of gauges 1600 that may be displayed according to embodiments of the present invention. The gauges may be virtual gauges on a monitor that include multi-part indicators for displaying information from the central server. In a preferred embodiment, the gauges are circular in shape and include a needle pivoting on a central axis and pointing to color indicators such as green, yellow and red indicators. However, those skilled in the art will understand that other types of virtual or real gauges, such as bar graph gauges, numerical displays, graphs, charts, and the like, may also be utilized. In FIG. 16, gauges 1604 are the target software instance examiner gauges for the four possible components (examiner types) (see block 1420 in FIG. 14). Gauge 1602 is an example of an individual target software instance examiner gauge for one of the components (e.g. throughput) for another instance that may be displayed along with the throughput gauge from the instance of 1604. The target software instance examiner gauge values generated in block 1420 of FIG. 14 may then be used to compute other gauge values at 1418, 1420, and 1422 of FIG. 14. A target software instance gauge 1606 (see block 1416 of FIG. 14) distills down the 3 or 4 target software instance examiner gauges for each target software instance into one target software instance examiner gauge for the entire target software instance.

Because there may be multiple target software instances running for the same target software type, three or four gauges 1608 (see block 1418 of FIG. 14), one for each examiner type, may combine the target software instance examiner gauges for a particular target software type and distill the gauge values down to a single target software type examiner gauge for that examiner type. Finally, the target software type examiner gauges can be distilled down into one target software type examiner gauge 1610 (see block 1422 of FIG. 14) indicating the state of health for that target software type. By distilling down real-time examiner values to a subset of gauge representations, and eventually to one gauge, a quick glance can reveal the state of health of the target software.

With gauges available for target software types and instances for various examiner types, behavior analysis can be performed at a desired level. For example, if a target software type is performing poorly according to its gauge values, a troubleshooter can drill down to gauges for specific instances to determine which instance is causing the problem.

In embodiments of the present invention, further gauges can be specified. For example, an application type may be running on both slow machines and fast machines, and it would be inaccurate to lump them together into the same gauge, so different application "types" can be created for the same application types running on different machines. It should be understood that because embodiments of the present invention perform behavior analysis using a subset of the available measurements, it become practical (datawise and computationally) to create multiple baselines for different times and machines.

However, because gauge representations of specific target software instances and types are computationally expensive, they are calculated only when required. For example, if the display of a particular gauge has not been requested, or alert notifications have not been requested, the gauge values will not be calculated. The calculation of gauge values is controlled by the out-bound communication publisher thread (see block 1208 of FIG. 12.)

Once the gauge values have been computed, in embodiments of the present invention alerts may be generated. An example of a simple alert is illustrated in FIG. 14. If a gauge is red at 1424, then an alert is raised at 1426, and the central server is notified.

Figure 17:
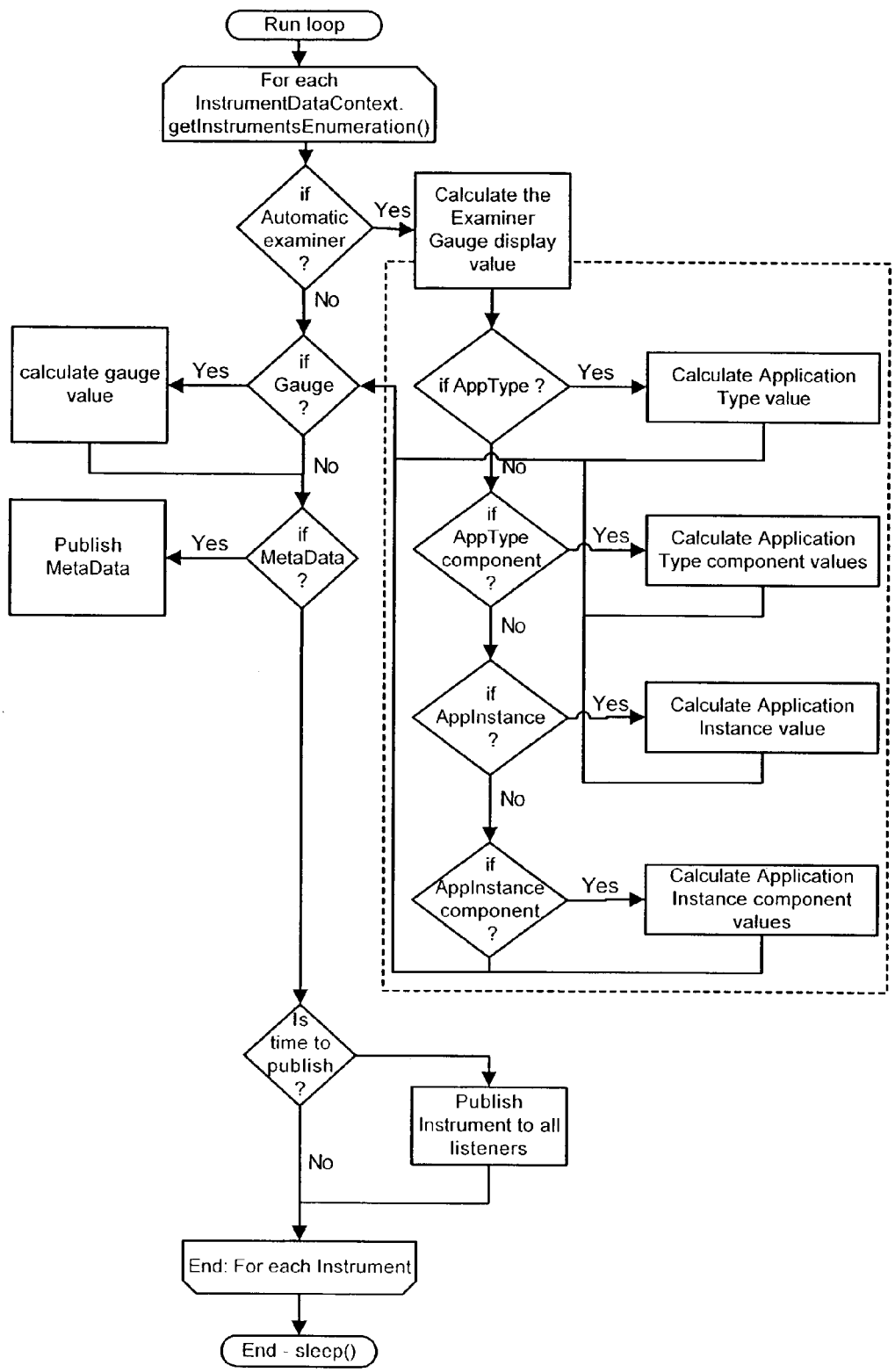
FIG. 17 is an exemplary flow diagram illustrating an ABM outbound communication thread (instrument publisher) according to embodiments of the present invention.

FIG. 17 is an exemplary flow diagram illustrating an ABM outbound communication thread (instrument publisher) (corresponding to block 1208 of FIG. 12 and blocks 1418, 1420, and 1422 of FIG. 14) according to embodiments of the present invention, which is a description of how the gauge values are derived. This is a separate thread that sends information to channel subscribers. It is started by the central server, and needs to be coordinated with the ABM publishing cycle. This could be implemented in many ways such as RMI, CORBA, JMS, and the like, well understood by those skilled in the art.

Figure 18:
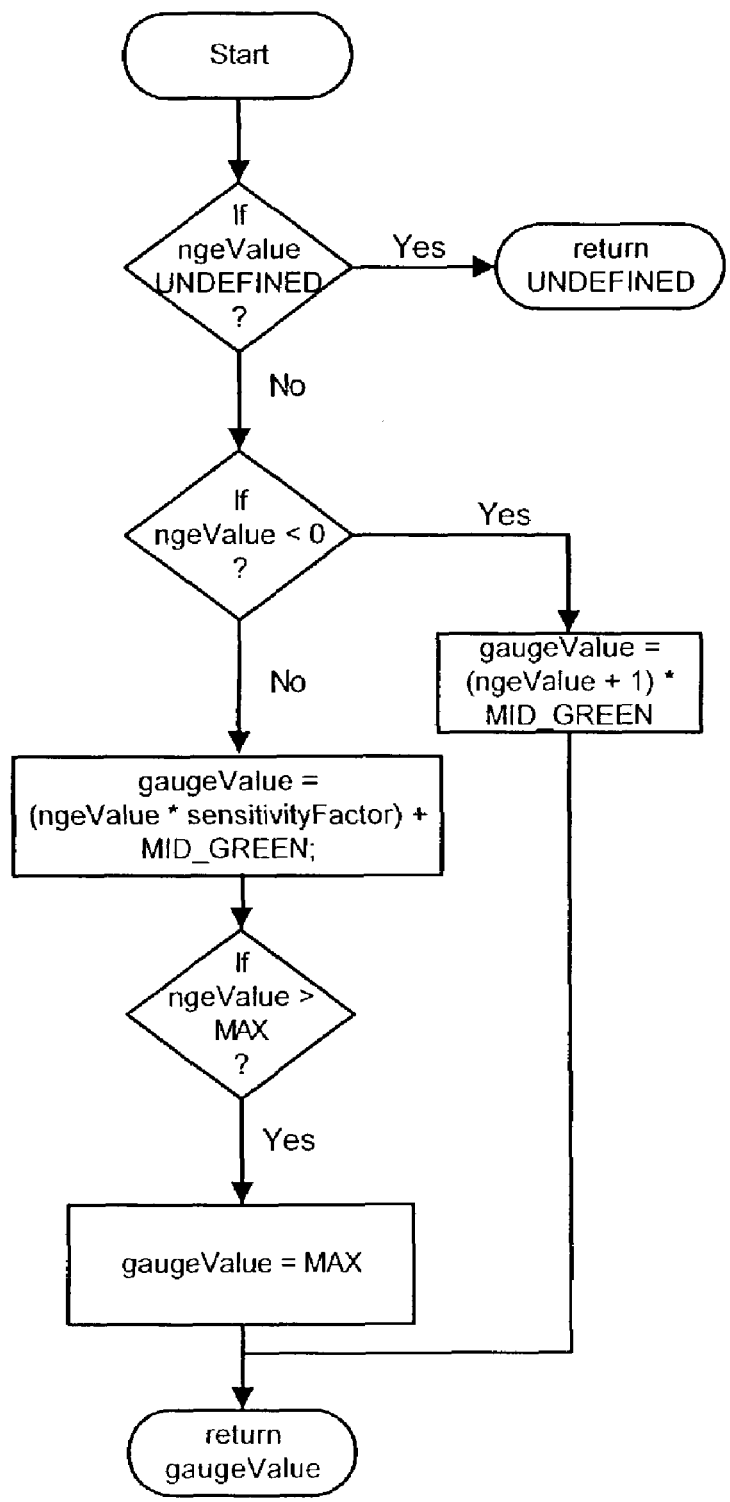
FIG. 18 is an exemplary flow diagram illustrating how the gauge values can be pegged if the gauge values are computed to be outside predetermined bounds according to embodiments of the present invention.

FIG. 18 is an exemplary flow diagram illustrating how the gauge values can be pegged if the gauge values are computed to be outside predetermined bounds, according to embodiments of the present invention. A normalized gauge value ngevalue is passed in as an argument. The gauge values may be represented in a single display that corresponds to an exact range (see, for example, the maximum ranges defined in FIG. 18) so that the gauge rendering has no mathematical complexity.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A target software behavior pattern recognition and analysis method for monitored target software being executed on a computer, the method comprising:

automatically defining one or more monitored code segments in the monitored target software, during run time of the monitored target software, wherein the monitored code segments are defined by sensors that are selectively embedded during run time of the monitored target software, and/or selectively turned on or off during run time of the monitored target software;

automatically deriving a subset of measurements from the monitored code segments indicating performance and activity of the monitored target software;

automatically deriving in real time a baseline from the subset of measurements, by computing an examiner value indicative of an aggregate of degree of change; and establishing in real time a state of health of the monitored target software based on comparing real-time measurements of the monitored target software to the baseline.

2. The method as recited in claim 1, the step of automatically deriving a subset of measurements further comprising:

determining resource utilization for each of the one or more monitored code segments; and adjusting a number of measurements taken for each of the one or more monitored code segments based on its resource utilization.

3. The method as recited in claim 2, wherein the resource utilization for each of the one or more monitored code segments is determined by:

collecting call rate and execution time data for the monitored code segment;

computing an average call rate and an avenge execution time for the monitored code segment; and multiplying the average call rate by the average execution time.

4. The method as recited in claim 3, further comprising adjusting the number of measurements taken for each of the one or more monitored code segments by activating or deactivating the collecting of call rate or execution time data for the monitored code segment.

5. The method as recited in claim 3, further comprising adjusting the number of measurements taken for each of the one or more monitored code segments based on a comparison of the average call rate or average execution time of the monitored code segment to specified thresholds.

6. The method as recited in claim 3, further comprising adjusting the number of measurements taken for each of the one or more monitored code segments by periodically sampling the call rate or execution time data for the monitored code segment.

7. The method as recited in claim 1, further comprising adjusting the number of measurements taken for each of the one or more monitored code segments such that an overhead penalty associated with the subset of measurements is less than a user selectable amount.

8. The method as recited, in claim 3, wherein for object-oriented monitored target software, the resource utilization for each of the one or more monitored code segments includes memory utilization data for a selected set of objects.

9. The method as recited in claim 3 wherein, during a data collection time period, tho stop of automatically deriving a baseline from the subset of measurements further comprises:
    computing an average throughput examiner code segment value by computing a first sum of the average execution times of all code segments for which execution time data was measured during the data collection time period, and dividing the first sum by a first number of code segments fur which execution time data was measured during the data collection time period;
    computing an average responsiveness examiner code segment value by computing a second sum of the average call rate of all code segments for which call rate data was measured during the data collection time period, and dividing the second sum by a second number of code segments for which call rate data was measured during the data collection time period;
    computing an average resource utilization examiner code segment value by multiplying the average throughput examiner value by the average responsiveness examiner value;
    for a throughput examiner value vector, which comprises the average throughput examiner code segment value computed during the data collection time period, updating a first database used to create a current throughput examiner code segment value baseline by adding the average throughput examiner code segment value to the first database, and computing an updated throughput examiner code segment value baseline from the updated first database;
    for a responsiveness examiner value vector, which comprises the average responsiveness examiner code segment value computed during the data collection time period, updating a second database used to create a current responsiveness examiner code segment value baseline by adding the average responsiveness examiner code segment value to the second database, and computing an updated responsiveness examiner code segment value baseline from the updated second database; and
    for a resource utilization examiner value vector, which comprises the average resource utilization examiner code segment value computed during the data collection time period, updating a third database used to create a current resource utilization examiner code segment value baseline by adding the average resource utilization examiner code segment value to the third database, and cumputing an updated resource utilization examiner code segment value baseline from the updated third database.

10. The method as recited in claim 9, further comprising maintaining multiple sets of databases and baselines for each examiner value, each set corresponding to different time periods longer than the data collection time period.

11. The method as recited in claim 9, the step of establishing a state of health of the monitored target software based on comparing real-time measurements of the monitored target software to the baseline further comprising computing a normalized examiner value for each average examiner code segment value by computing (aiAvg−Ea)/Ea, where Ea is the average examiner code segment value and aiAvg is the baseline for that average examiner code segment value.

12. The method as recited in claim 9 wherein, during the data collection time period, the step of automatically deriving a baseline from the subset of measurements further comprises:
    creating a deviant list of code segments having an execution time that exceeds a particular threshold, the code segments in the deviant list being excluded from the computation of the average responsiveness examiner value; and
    including the deviant list as part or the examiner value vector.

13. The method as recited in claim 11, further comprising displaying one examiner value gauge representing die normalized examiner value for each of the one or more average examiner values.

14. The method as recited in claim 13, the examiner value gauges including multi-part indicators for displaying information from the central server.

15. The method as recited in claim 13, further comprising:
    computing a normalized instance examiner value by averaging the normalized examiner value for all of the one or more average examiner values; and
    displaying one instance examiner value gauge representing the normalized instance examiner value.

16. The method as recited in claim 11, further comprising generating an alert when the normalized examiner value exceeds a predetermined limit.

17. In a system for performing target software behavior pattern recognition and analysis on monitored target software being executed on a computer, the monitored target software including one or more monitored code segments defined during run time of the monitored target software, wherein the monitored code segments are defined by sensors that are selectively embedded during run time of the monitored target software, and/or selectively turned on or off during run time of the monitored target software, a method for automatically deriving a subset of measurements from the monitored code segments indicating performance and activity of the monitored target software for use in deriving in real time a baseline from the subset of measurements by computing an examiner value indicative of an aggregate of degree of change and establishing in real time a state of health of the monitored target software based on comparing real-time measurements of the monitored target software to the baseline, the method comprising:
    determining resource utilization for each of the one or more monitored code segments; and
    adjusting a number of measurements taken for each of the one or more monitored code segments based on its resource utilization;
    wherein the resource utilization for each of the one or more monitored code segments is determined by collecting call rate and execution time data for the monitored code segment, computing an average call rate and an average execution time for the monitored code segment, and multiplying the average call rate by the average execution time.

18. The method as recited in claim 17, further comprising adjusting the number of measurements taken for each of the one or more monitored code segments by activating or deactivating the collection of call rate or execution time data for the monitored code segment.

19. The method as recited in claim 17, further comprising adjusting the number of measurements taken for each of the one or more monitored code segments based on a comparison of the average call rate or average execution time of the monitored code segment to specified thresholds.

20. The method as recited in claim 17, further comprising adjusting the number of measurements taken for each of the one or more monitored code segments by periodically sampling the call rate or execution time data for the monitored code segment.

21. The method as recited in claim 17, further comprising adjusting the number of measurements taken for each of the one or more monitored code segments such that an overhead penalty associated with the subset of measurements is less than a user selectable amount.

22. The method as recited in claim 17, wherein for object-oriented monitored target software, the resource utilization for each of the one or more monitored code segments includes memory utilization data for a selected set of objects.

23. In a system for performing target software behavior pattern recognition and analysis on monitored target software being executed on a computer, the monitored target software including one or more monitored code segments defined during run time of the monitored target software which are capable of providing a subset of measurements from the monitored code segments during a data collection time period indicating performance and activity of the monitored target software, the subset of measurements determinable by collecting call rate and execution time data for each monitored code segment, computing an average call rate and an average execution time for each monitored code segment, multiplying the average call rate by the average execution time to generate a resource utilization for each monitored code segment, and adjusting a number of measurements taken for each monitored code segment based on its resource utilization, wherein the monitored code segments are defined by sensors that are selectively embedded during run time of the monitored target software, and/or selectively turned on or off during run time of the monitored target software, a method comprising automatically deriving in real time a baseline from the subset of measurements by computing an examiner value indicative of an aggregate of degree of change during the data collection time period for use in establishing in real time a state of health of the monitored target software by comparing real-time measurements of the monitored target software to the baseline, the method further comprising:

determining an average throughput examiner code segment value by computing a first sum of the average execution times of all code segments for which execution time data was measured during the data collection time period, and dividing the first sum by a first number of code segments for which execution time data was measured during the data collection time period;

determining an average responsiveness examiner code segment value by computing a second sum of the average call rate of all code segments for which call rate data was measured during the data collection time period, and dividing the second sum by a second number of code segments for which call rate data was measured during the data collection time period;

determining an average resource utilization examiner code segment value by multiplying the average throughput examiner value by the average responsiveness examiner value;

for a throughput examiner value vector, which comprises the average throughput examiner code segment value computed during the data collection time period, updating a first database used to create a current throughput examiner code segment value baseline by adding the average throughput examiner code segment value to the first database, and computing an updated throughput examiner code segment value baseline from the updated first database;

for a responsiveness examiner value vector, which comprises the average responsiveness examiner code segment value computed during the data collection time period, updating a second database used to create a current responsiveness examiner code segment value baseline by adding the average responsiveness examiner code segment value to the second database, and computing an updated responsiveness examiner code segment value baseline from the updated second database; and for a resource utilization examiner value vector, which comprises the average resource utilization examiner code segment value computed during the data collection time period, updating a third database used to create a current resource utilization examiner code segment value baseline by adding the average resource utilization examiner code segment value to the third database, and computing an updated resource utilization examiner code segment value baseline from the updated third database.

24. The method as recited in claim 23, further comprising maintaining multiple sets of databases and baselines for each examiner value, each set corresponding to different time periods longer than the data collection time period.

25. The method as recited in claim 23, further comprising establishing a state of health of the monitored target software by comparing real-time measurements of the monitored target software to the baseline.

26. The method as recited in claim 25, the step of comparing real-time measurements of the monitored target software to the baseline comprising computing a normalized examiner value fur each average examiner code segment value by computing (aiAvg−Ea)/Ea, where Ea is the average examiner value and aiAvg is the baseline for that average examiner value.

27. The method as recited in claim 23, further comprising:
creating a deviant list of code segments having an execution time that exceeds a particular threshold, the code segments in the deviant list being excluded from the computation of the average responsiveness examiner value; and
including the deviant list as part of the examiner value vector.

28. The method as recited in claim 27, further comprising displaying one examiner value gauge representing the normalized examiner value for each of the one or more average examiner values.

29. The method as recited in claim 28, the examiner value gauges including multi-pan indicators for displaying information from the central server.

30. The method as recited in claim 28, further comprising:
computing a normalized instance examiner value by averaging the normalized examiner value for all of the one or more average examiner values; and
displaying one instance examiner value gauge representing the normalized instance examiner value.

31. The method as recited in claim 26, further comprising generating an alert when the normalized examiner value exceeds a predetermined limit.

32. An article of manufacture comprising:
a computer usable medium having computer readable program code means embodied therein for target software behavior pattern recognition and analysis of monitored target software being executed on a computer, the computer readable program code means in the article of manufacture comprising:
computer readable program code means for automatically defining one or more monitored code segments in the monitored target software during run time of the monitored target software, wherein the monitored code segments are defined by sensors that are selectively embedded during run time of the monitored target software, and/or selectively turned on or off during run time of the monitored target software;
computer readable program code means for causing a computer to automatically derive a subset of measurements from the monitored code segments indicating performance and activity of the monitored target software;
computer readable program code means for causing the computer to automatically derive in real time a baseline from the subset of measurements by computing an examiner value indicative of an aggregate of degree of change; and
computer readable program code means for causing the computer to establish in real time a state of health of the monitored target software based on comparing real-time measurements of the monitored target software to the baseline.

33. The article of manufacture as recited in claim 32, the computer readable program code means for causing a computer to automatically derive a subset of measurements further comprising:
computer readable program code means for causing the computer to determine resource utilization for each of the one or more monitored code segments; and
computer readable program code means for causing the computer to adjust a number of measurements taken for each of the one or more monitored code segments based on its resource utilization.

34. The article of manufacture as recited in claim 33, further comprising: computer readable program code means for causing the computer to compute the resource utilization for each of the one or more monitored code segments by:
collecting call rate and execution time data for the monitored code segment;
computing an average call rate and an average execution time for the monitored code segment; and
multiplying the average call rate by the average execution time.

35. The article of manufacture as recited in claim 34, further comprising computer readable program code means for causing the computer to adjust the number of measurements taken for each of the one or more monitored code segments by activating or deactivating the collecting of call rate or execution time data forte monitored code segment.

36. The article of manufacture as recited in claim 34, further comprising computer readable program code means for causing the computer to, adjust the number of measurements taken for each of the one or more monitored code segments based on a comparison of the average call rate or average execution time of the monitored code segment to specified thresholds.

37. The article of manufacture as recited in claim 34, further comprising computer readable program code means for causing the computer to adjust the number of measurements taken for each of the one or more monitored code segments by periodically sampling the call rate or execution time data for the monitored code segment.

38. The article of manufacture as recited in claim 32, further comprising computer readable program code means for causing the computer to adjust the number of measurements taken fur each of the one or more monitored code segments such that an overhead penalty associated with the subset of measurements is less than a user selectable amount.

39. The article of manufacture as recited in claim 34, wherein for object-oriented monitored target software, the computer readable program code means for causing the computer to compute the resource utilization for each of the one or more monitored code segments further comprises:
computer readable program code means for causing the computer to include memory utilization data for a selected set of objects in the resource utilization for each of the one or more monitored code segments.

40. The article, of manufacture as recited in claim 34 wherein, during a data collection time period, the computer readable program code means for causing the computer to automatically derive a baseline from the subset of measurements further comprises:
computer readable program code means for causing the computer to compute an average throughput examiner code segment value by computing a first sum of the average execution times of all code segments for which execution time data was measured during the data collection time period, and dividing the first sum by a first number of code segments for which execution time data was measured during the data collection time period;
computer readable program code means for causing the computer to compute an average responsiveness examiner code segment value by computing a second sum of the average call rate of all code segments for which call rate data was measured during the data collection time period, and dividing the second sum by a second number of code segments for which call rate data was measured during the data collection time period;
computer readable program code means for causing the computer to compute an average resource utilization examiner code segment value by multiplying the average throughput examiner value by the average responsiveness examiner value;
for a throughput examiner value vector, which comprises the average throughput examiner code segment value computed during the data collection time period, computer readable program code means for causing the computer to update a first database used to create a current throughput examiner code segment value baseline by adding the average throughput examiner code segment value to the first database, and compute an updated throughput examiner code segment value baseline from the updated first database;

for a responsiveness examiner value vector, which comprises the average responsiveness examiner code segment value computed during die data collection time period, computer readable program code means for causing the computer to update a second database used to create a current responsiveness examiner code segment value baseline by adding the average responsiveness examiner code segment value to the second database, and compute an updated responsiveness examiner code segment value baseline from the updated second database; and for a resource utilization examiner value vector, which comprises the average resource utilization examiner code segment value computed during the data collection time period, computer readable program code means for causing the computer to updating a third database used to create a current resource utilization examiner code segment value baseline by adding the average resource utilization examiner code segment value to the third database, and computing an updated resource utilization examiner code segment value baseline from the updated third database.

41. The article of manufacture as recited in claim 40, further comprising computer readable program code means for causing the computer to maintain multiple sets of databases and baselines for each examiner value, each set corresponding to different time periods longer than the data collection time period.

42. The article of manufacture as recited in claim 40, the computer readable program code means for causing the computer to establish a state of health of the monitored target software based on comparing real-time measurements of the monitored target software to the baseline further comprising:

computer readable program code means for causing the computer to compute a normalized examiner value for each average examiner code segment value by computing (aiAvg−Ea)/Ea, where Ea is the average examiner code segment value and aiAvg is the baseline for that average examiner code segment value.

43. The article of manufacture as recited in claim 40 wherein, during the data collection time period, the computer readable program code means for causing the computer to automatically derive a baseline from the subset of measurements further comprises:

computer readable program code means for causing the computer to create a deviant list of code segments having an execution time that exceeds a particular threshold, the code segments in the deviant list being excluded from the computation of the average responsiveness examiner value; and computer readable program code means for causing the computer to include the deviant list as part of the examiner value vector.

44. The article of manufacture as recited in claim 42, further comprising computer readable program code means for causing the computer to display one examiner value gauge representing the normalized examiner value for each of the one or more average examiner values.

45. The article of manufacture as recited in claim 44, further comprising computer readable program code means for causing the computer to display examiner value gauges including multi-pad indicators for displaying information from the central server.

46. The article of manufacture as recited in claim 44, further comprising:

computer readable program code means for causing the computer to compute a normalized instance examiner value by averaging the normalized examiner value for all of the one or more average examiner values; and computer readable program code means for causing the computer to display one instance examiner value gauge representing the normalized instance examiner value.

47. The ankle of manufacture as recited in claim 42, further comprising computer readable program code means for causing the computer to generate an alert when the normalized examiner value exceeds a predetermined limit.

48. In a system for performing target software behavior pattern recognition and analysis on monitored target software being executed on a computer, an article of manufacture comprising:

a computer usable medium having computer readable program code means embodied therein for automatically deriving a subset of measurements from monitored code segments defined during run time of the monitored target software, indicating performance and activity of the monitored target software for use in deriving in real time a baseline from the subset of measurements by computing an examiner value indicative of an aggregate of degree of change and establishing in real time a state of health of the monitored target software based on comparing real-time measurements of the monitored target software to the baseline, wherein the monitored code segments are defined by sensors that are selectively embedded during run time of the monitored target software, and/or selectively turned on or off during run time of the monitored target software, comprising:

computer readable program code means for causing a computer to determine resource utilization for each of the one or more monitored code segments;

computer readable program code means for causing the computer to adjust a number of measurements taken for each of the one or more monitored code segments based on its resource utilization; and computer readable program code means for causing the computer to determine the resource utilization for each of the one or more monitored code segments by collecting call rate and execution time data for the monitored code segment, computing an average call rate and an average execution time for the monitored code segment, and multiplying the average call rate by the average execution time.

49. The article of manufacture as recited in claim 48, further comprising computer readable program code means for causing the computer to adjust the number of measurements taken for each of the one or more monitored code segments by activating or deactivating the collection of call rate or execution time data for the monitored code segment.

50. The article of manufacture as recited in claim 48, further comprising computer readable program code means for causing the computer to adjust the number of measurements taken for each of the one or more monitored code segments bused on a comparison of the average call rate or average execution time of the monitored code segment to specified thresholds.

51. The article of manufacture as recited in claim 48, further comprising computer readable program code means for causing the computer to adjust the number of measurements taken for each of the one or more monitored code segments by periodically sampling the call rate or execution time data for the monitored code segment.

52. The article of manufacture as recited in claim 48, further comprising computer readable program code means for causing the computer to adjust the number of measurements taken for each of the one or more monitored code segments such that an overhead penalty associated with the subset of measurements is less than a user selectable amount.

53. The article of manufacture as recited in claim 48, wherein for object oriented monitored target software, the computer readable program code means for causing the computer to determine the resource utilization for each of the one or more monitored code segments further comprises:

computer readable program code means for causing the computer to include memory utilization data for a selected set of objects in the resource utilization for each of the one or more monitored code segments.

54. In a system for performing target software behavior pattern recognition and analysis on monitored target software being executed on a computer, the monitored target software including one or more monitored code segments capable of providing a subset of measurements from the monitored code segments during a data collection time period indicating performance and activity of the monitored target software, the subset of measurements determinable by collecting call rate and execution time data for each monitored code segment, computing an average call rate and an average execution time for each monitored code segment, multiplying the average call rate by the average execution time to generate a resource utilization for each monitored code segment, and adjusting a number of measurements taken for each monitored code segment based on its resource utilization, an article of manufacture comprising:

a computer usable medium comprising computer readable program code means embodied therein for automatically defining the monitored code segments during run time of the monitored target software, automatically deriving in real time a baseline from the subset of measurements by computing an examiner value indicative of an aggregate of degree of change during the data collection time period for use in establishing in real time a state of health of the monitored target software by comparing real-time measurements of the monitored target software to the baseline, wherein the monitored code segments are defined by sensors that are selectively embedded during run time of the monitored target software, and/or selectively turned on or off during run time of the monitored target software, said computer usable medium further comprising:

computer readable program code means for causing a computer to compute an average throughput examiner code segment value by computing a first sum of the average execution times of all code segments for which execution time data was measured during the data collection time period, and dividing the first sum by a first number of code segments for which execution time data was measured during the data collection time period;

computer readable program code means for causing the computer to compute an average responsiveness examiner code segment value by computing a second sum of the average call rate of all code segments for which call rate data was measured during the data collection time period, and dividing the second sum by a second number of code segments for which call rate data was measured during the data collection time period;

computer readable program code means for causing the computer to compute an average resource utilization examiner code segment value by multiplying the average throughput examiner value by the average responsiveness examiner value;

for a throughput examiner value vector, which comprises the average throughput examiner code segment value computed during the data collection time period, computer readable program code means for causing the computer to update a first database used to create a current throughput examiner code segment value baseline by adding the average throughput examiner code segment value to the first database, and compute an updated throughput examiner code segment value baseline from the updated first database;

for a responsiveness examiner value vector, which comprises the average responsiveness examiner code segment value computed during the data collection time period, computer readable program code means for causing the computer to update a second database used to create a current responsiveness examiner code segment value baseline by adding the average responsiveness examiner code segment value to the second database, and compute an updated responsiveness examiner code segment value baseline from the updated second database; and for a resource utilization examiner value vector, which comprises the average resource utilization examiner code segment value computed during the data collection time period, computer readable program code means for causing the computer to updating a third database used to create a current resource utilization examiner code segment value baseline by adding the average resource utilization examiner code segment value to the third database, and computing an updated resource utilization examiner code segment value baseline from the updated third database.

55. The article of manufacture as recited in claim 54, further comprising computer readable program code means for causing the computer to maintain, multiple sets of databases and baselines for each examiner value, each set corresponding to different time periods longer than the data collection time period.

56. The article of manufacture as recited in claim 54, further comprising computer readable program code means for causing the computer to establish a state of health of the monitored target software by comparing real-time measurements of the monitored target software to the baseline.

57. The article of manufacture as recited in claim 56, the computer readable program code means for causing the computer to compare real-time measurements of the monitored target software to the baseline further comprising:

computer readable program code means for causing the computer to compute a normalized examiner value for each average examiner code segment value by computing $(aiAvg-Ea)/Ea$, where $Ea$ is the average examiner value and $aiAvg$ is the baseline for that average examiner value.

58. The article of manufacture as recited in claim 54, further comprising:

computer readable program code means for causing the computer to create a deviant list of code segments having an execution time that exceeds a particular threshold, the code segments in the deviant list being excluded from the computation of the average responsiveness examiner value; and computer readable program code means for causing the computer to include the deviant list as part of the examiner value vector.

59. The article of manufacture as recited in claim 58, further comprising computer readable program code means for causing the computer to display examiner value gauges representing the normalized examiner value for each of the one or more average examiner values.

60. The article of manufacture as recited in claim 59, further comprising computer readable program code means for causing the computer to display examiner value gauges including multi-part indicators for displaying information from the central server.

61. The article of manufacture as recited in claim 59, further comprising computer readable program code means for causing the computer to:
    compute a normalized instance examiner value by averaging the normalized examiner value for all of the one or more average examiner values; and
    display one instance examiner value gauge representing the normalized instance examiner value.

62. The article of manufacture as recited in claim 57, further comprising computer readable program code means for causing the computer to generate an alert when the normalized examiner value exceeds a predetermined limit.

* * * * *